(12) United States Patent
Futamata et al.

(10) Patent No.: US 12,710,566 B2
(45) Date of Patent: Aug. 18, 2026

(54) OPTICAL FILM, DISPLAY DEVICE, AND COMPOSITION FOR FORMING COLORED LAYER

(71) Applicant: TOPPAN INC., Tokyo (JP)

(72) Inventors: Kai Futamata, Tokyo (JP); Yoshiko Ishimaru, Tokyo (JP); Shinya Ishikawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 293 days.

(21) Appl. No.: 18/405,213

(22) Filed: Jan. 5, 2024

(65) Prior Publication Data

US 2024/0151879 A1 May 9, 2024

Related U.S. Application Data

(63) Continuation of application No. PCT/JP2022/026904, filed on Jul. 7, 2022.

(30) Foreign Application Priority Data

Jul. 7, 2021 (JP) ................................ 2021-113002

(51) Int. Cl.
*G02B 1/00* (2006.01)
*G02B 1/11* (2015.01)

(52) U.S. Cl.
CPC ..................................... *G02B 1/11* (2013.01)

(58) Field of Classification Search
CPC . G02B 1/11; G02B 1/14; G02B 5/223; G02B 1/111; G02B 1/16; G02B 1/18;
(Continued)

(56) References Cited

U.S. PATENT DOCUMENTS 9,112,179 B2 8/2015 Park et al.
2008/0219011 A1 9/2008 Sin et al.
(Continued)

FOREIGN PATENT DOCUMENTS

JP 2005-070724 A 3/2005
JP 2008-059836 A 3/2008
(Continued)

OTHER PUBLICATIONS

Office Action issued in corresponding Taiwanese Patent Application No. 111125484 dated Nov. 18, 2025.

(Continued)

*Primary Examiner* — Henry Duong
(74) *Attorney, Agent, or Firm* — Foley & Lardner LLP

(57) ABSTRACT

An optical film comprises: a transparent substrate having an ultraviolet blocking rate of 85% or more according to JIS L 1925; one or more functional layers formed on a first surface side of the transparent substrate; and a colored layer that is formed on a second surface side of the transparent substrate that is configured by one or more layers containing a colored material. The colored layer contains a first colorant that has a maximum absorption wavelength in a range of 470 nm or more and 530 nm or less, an absorption spectrum thereof having a half-width of 15 nm or more and 45 nm or less, and a second colorant that has a maximum absorption wavelength in a range of 560 nm or more and 620 nm or less, an absorption spectrum thereof having a half-width of 15 nm or more and 55 nm or less.

14 Claims, 4 Drawing Sheets

(58) Field of Classification Search

CPC ... G02B 5/22; G02B 5/003; C08F 2/48; C08F 2/50; C08F 257/02; C08J 2301/12; C08J 2333/12; C08J 2367/02; C08J 2433/06; C08J 7/042; C08J 7/046; C08J 7/048; C08J 7/044; C08J 7/054; C08K 5/0041; C08K 5/0091; C08K 5/3435; C08K 5/3475; C08K 5/3492; C08K 5/005; C08K 5/17; H10K 59/10; H10K 77/10; B32B 27/08; B32B 27/16; B32B 27/18; B32B 27/20; B32B 27/36; B32B 27/365; B32B 7/023; H05B 33/12; C09D 7/48; C09D 7/41; C09D 7/63; G09F 9/30; B60J 3/04

USPC .......................................................... 359/614

See application file for complete search history.

(56) References Cited

U.S. PATENT DOCUMENTS

| | | | |
|---|---|---|---|
| 2016/0216604 A1 | 7/2016 | Fujita et al. | |
| 2016/0349573 A1 | 12/2016 | Ohmuro et al. | |
| 2018/0057690 A1 | 3/2018 | Mori et al. | |
| 2020/0225577 A1 | 7/2020 | Takahashi et al. | |
| 2022/0109128 A1* | 4/2022 | Fukagawa | C09B 67/0034 |

FOREIGN PATENT DOCUMENTS

| | | | |
|---|---|---|---|
| JP | 2008-083682 | A | 4/2008 |
| JP | 2009-139754 | A | 6/2009 |
| JP | 4570042 | B2 | 10/2010 |
| JP | 2011-141356 | A | 7/2011 |
| JP | 5673713 | B2 | 2/2015 |
| JP | 2017-203810 | A | 11/2017 |
| JP | 2017-211744 | A | 11/2017 |
| JP | 2018-136361 | A | 8/2018 |
| KR | 10-2019-0109988 | A | 9/2019 |
| TW | 201522521 | A | 6/2015 |
| WO | WO-2010/073857 | A1 | 7/2010 |
| WO | WO-2015/098906 | A1 | 7/2015 |
| WO | WO-2021/014973 | A1 | 1/2021 |

OTHER PUBLICATIONS

European Extended Search Report issued in corresponding European Patent Application No. 22837728.9 dated Sep. 27, 2024 (8 pages).

International Searching Authority, “International Search Report,” issued in connection with International Patent Application No. PCT/JP2022/026904, dated Sep. 20, 2022.

International Searching Authority, “Written Opinion,” issued in connection with International Patent Application No. PCT/JP2022/026904, dated Sep. 20, 2022.

Office Action issued in corresponding Japanese Patent Application No. 2021-113002 dated Oct. 4, 2022 (6 pages).

* cited by examiner

OPTICAL FILM, DISPLAY DEVICE, AND COMPOSITION FOR FORMING COLORED LAYER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/026904, filed on Jul. 7, 2022, which is based upon and claims the benefit of priority to Japanese Patent Application No. 2021-113002, filed on Jul. 7, 2021, the disclosures of which are incorporated herein by reference in their entirety.

TECHNICAL FIELD

The present invention relates to an optical film, a display device, and a composition for forming a colored layer.

BACKGROUND

Self-luminous display devices provided with self-luminous elements such as organic light-emitting elements differ from liquid-crystal display devices and the like in that they have superior features such as excellent miniaturization, low power consumption, high brightness, and high response speed, and are expected to be the next-generation of display devices. Metal electrodes and wiring are formed inside a display surface area of a self-luminous display device. Therefore, light incident from outside the display screen (that is, external light) is reflected by the electrodes and wiring, which tends to cause a decrease in the display quality, such as a reduction in contrast.

In order to solve the above problem, a configuration has been proposed in which, for example, a polarizing plate and a phase delay plate are disposed on the surface of a self-luminous display device. However, in a configuration that uses a polarizing plate and a phase difference delay plate, when the light emitted from the display device passes through the polarizing plate and the phase difference delay plate and is then externally emitted, most of the light is lost, which tends to reduce the life of the element.

Furthermore, display devices are required to have high color purity. The color purity indicates the range of colors that can be displayed by a display device, and is also referred to as the color reproduction range. Therefore, a high color purity indicates a wide color reproduction range and good color reproducibility. As a means of improving the color reproducibility, a method in which color separation is performed using a color filter for a light source that emits white light, and a method in which a light source that emits monochromatic light of the three primary colors RGB is corrected with a color filter to narrow the half-value, are known, but when using a color filter to improve the color reproducibility of a display device, it is necessary to increase the thickness of the color filter and increase the concentration of the colorants, which has the problem that the display quality can decrease due to the pixel shape, or a deterioration in the viewing angle characteristics may occur, and the like. Furthermore, with respect to a display device that emits monochromatic light of the three primary colors RGB, a color filter forming step is required, which results in increased cost.

For example, as a display device having a different configuration to those described above, namely a configuration in which a polarizing plate and a phase difference delay plate are disposed, and a configuration using a color filter, PTL 1 discloses an organic light-emitting display device provided with a display substrate that includes an organic light-emitting element, and a sealing substrate that is disposed so as to be separated from the display substrate, wherein a filler that selectively absorbs external light of each wavelength band and adjusts the transmittance is embedded in a space between the display substrate and the sealing substrate. This configuration improves the visibility by suppressing external light reflection, and also improves color purity because light in wavelength bands that particularly decrease color purity, among the light emitted from the display device, is absorbed. However, in the disclosed technique, there is a problem that the suppression of external light reflection is insufficient, and the reflected light is colored. Furthermore, colorants that absorb light at specific wavelengths have insufficient reliability in terms of the lightfastness and the like, making it difficult to put them into practical use.

[Citation List] [Patent Literature] PTL 1: JP 5673713 B.

SUMMARY OF THE INVENTION

Technical Problem

However, the conventional technique described above has the following problems.

In a device using a polarizing plate and a phase delay plate, although the amount of reflected light due to external light can be suppressed, there is a problem that the amount of display light generated in the organic light-emitting element also decreases.

Further, in terms of the filler having wavelength-selective absorption characteristics as disclosed in PTL 1, a configuration has been proposed that includes a colored material having a maximum absorption wavelength in a wavelength range of 480 nm to 510 nm, and a colored material having a maximum absorption wavelength in a wavelength range of 580 nm to 610 nm. As a result, there is a problem that it is difficult to remove the influence of external light in a wavelength range of 480 nm or less, and a wavelength range exceeding 610 nm. If external light in such wavelength bands cannot be suppressed, the effect of reducing the reflectance is not sufficient and deterioration of the reflected hue occurs.

In addition, colored materials imparted with the wavelength-selective absorption characteristics mentioned above have insufficient reliability in terms of lightfastness and the like, making it difficult to put them into practical use unless the reliability is improved.

In view of the circumstances described above, the present invention has an object of providing an optical film that is capable of achieving an improvement in display quality and extending the life of a light-emitting element, a display device using the same, and a composition for forming a colored layer used in the production of a film.

Solution to Problem

A first aspect of the present invention is an optical film including: a transparent substrate having an ultraviolet blocking rate of 85% or more according to JIS L 1925; one or more functional layers formed on a first surface side of the transparent substrate; and one or more colored layers that are formed on a second surface side of the transparent substrate.

The colored layer contains a first colorant that has a maximum absorption wavelength in a range of 470 nm or more and 530 nm or less, and an absorption spectrum thereof having a half-width of 15 nm or more and 45 nm or less, and a second colorant that has a maximum absorption wavelength in a range of 560 nm or more and 620 nm or less, and an absorption spectrum thereof having a half-width of 15 nm or more and 55 nm or less.

One of the functional layer and the colored layer contains a black organic pigment.

In the optical film, the hue values a* and b* defined by equations (1) to (9) below are each in a range of −5 or more and +5 or less.

[Math. 1]

$$a^* = 500\left\{f\left(\frac{X}{X_n}\right) - f\left(\frac{Y}{Y_n}\right)\right\} \tag{1}$$

[Math. 2]

$$b^* = 200\left\{f\left(\frac{Y}{Y_n}\right) - f\left(\frac{Z}{Z_n}\right)\right\} \tag{2}$$

[Math. 3]

$$f(t) = \begin{cases} t^{\frac{1}{3}} & \left[t > \left(\frac{6}{29}\right)^3\right] \\ \frac{1}{3}\left(\frac{29}{6}\right)^2 t + \frac{4}{29} & \left[t \le \left(\frac{6}{29}\right)^3\right] \end{cases} \tag{3}$$

[Math. 4]

$$R1(\lambda)[\%] = \frac{(100 - R2(\lambda))}{100} \times \frac{T(\lambda)}{100} \times \frac{T(\lambda)}{100} \times R_E(\lambda) \tag{4}$$

[Math. 5]

$$R(\lambda)[\%] = R1(\lambda) + R2(\lambda) \tag{5}$$

[Math. 6]

$$X = k \times \int_{380}^{780} P_{D65}(\lambda) \times R(\lambda) \times \bar{x}(\lambda)\, d\lambda \tag{6}$$

[Math. 7]

$$Y = k \times \int_{380}^{780} P_{D65}(\lambda) \times R(\lambda) \times \bar{y}(\lambda)\, d\lambda \tag{7}$$

[Math. 8]

$$Z = k \times \int_{380}^{780} P_{D65}(\lambda) \times R(\lambda) \times \bar{z}(\lambda)\, d\lambda \tag{8}$$

[Math. 9]

$$k = 100 / \int_{380}^{780} P_{D65}(\lambda) \times R(\lambda) \times \bar{y}(\lambda)\, d\lambda \tag{9}$$

Here, λ is a variable representing a wavelength, and t is a variable representing a ratio of X, Y, and Z with respect to $X_n$, $Y_n$, and $Z_n$.

a* and b* calculated from equations (1) to (3) are calculated according to a calculation method in a CIE 1976 L*, a*, b* color space (CIELAB color space). In equations (1) and (2), $X_n$, $Y_n$, and $Z_n$ are tri stimulus values at the white point of a D65 light source.

In equation (4), REQ) is a function representing a reflectance [%] at a completely diffuse reflectance surface (100% for each wavelength), R2(λ) is a function representing a surface reflectance [%] at an outermost surface of the functional layer on an opposite side to the colored layer, and T(λ) is a function representing a transmittance of the optical film.

In equations (6) to (9), $P_{D65}(\lambda)$ is a D65 light source spectrum, $\bar{x}(\lambda)$, $\bar{y}(\lambda)$, and $\bar{z}(\lambda)$ are CIE1931 color matching functions at 2° field of view.

The definite integral in equations (6) to (9) can be calculated by an appropriate numerical integration. The wavelength interval when performing numerical integration is, for example, a 1 nm interval.

In equation (5), R(λ) represents a reflectance of the optical film with respect to incident light from an opposite side to the colored layer, taking into account internal reflection of the transparent substrate of the optical film.

X, Y, and Z represented by equations (6) to (8) represent tristimulus values at the white point of a D65 light source.

A second aspect of the present invention is a display device including a light source, and an optical film according to the first aspect.

A third aspect of the present invention is a composition for forming a colored layer containing an active energy ray-curable resin, a photopolymerization initiator, a black organic pigment, a colored material, an additive, and a solvent.

The colored material contains at least one of a first colorant that has a maximum absorption wavelength in a range of 470 nm or more and 530 nm or less, and an absorption spectrum thereof having a half-width of 15 nm or more and 45 nm or less, and a second colorant that has a maximum absorption wavelength in a range of 560 nm or more and 620 nm or less, and an absorption spectrum thereof having a half-width of 15 nm or more and 55 nm or less.

The additive includes a radical scavenger.

Advantageous Effects of the Invention

According to the present invention, it is possible to provide an optical film, a display device, and a composition for forming a colored layer that can improve the display quality due to external light reflection, and improve the life of the light-emitting element of a display device.

DETAILED DESCRIPTION

Embodiments of the present invention will be described below with reference to the drawings. In the following description of the drawings to be referred, components identical with or similar to each other are given the same or similar reference signs. It should be noted that the drawings are only schematically illustrated, and thus the relationship between thickness and two-dimensional size of the components, and any thickness ratios, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. In addition, the drawings are exaggerated as appropriate to facilitate understanding.

Hereinafter, embodiments of the present invention will be described with reference to the drawings.

First Embodiment

An optical film and a display device according to a first embodiment of the present invention will be described.

Figure 1:
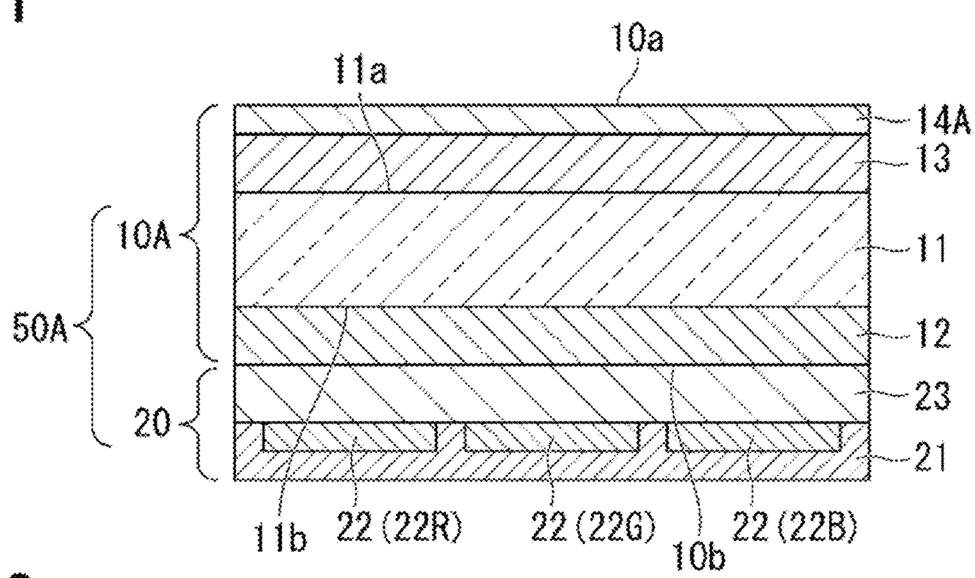
FIG. 1 is a schematic cross-sectional view showing an example of an optical film and a display device according to a first embodiment of the present invention.

FIG. 1 is a schematic cross-sectional view showing an example of an optical film and a display device according to the present embodiment.

The display device 50A of the present embodiment, whose cross-section in the thickness direction is shown in FIG. 1, displays a color image based on an image signal. The display device 50A includes a display unit 20 and an optical film 10A of the present embodiment.

The display unit 20 includes a substrate 21, light-emitting elements 22, and a color filter unit 23.

The substrate 21 is formed of, for example, a silicon substrate.

The light-emitting elements 22 emit white light. For example, organic EL elements may be used as the light-emitting elements 22. In an organic EL element, a DC voltage is applied between an anode and a cathode, electrons and holes are injected into an organic light-emitting layer and recombined so as to generate excitons, and light is emitted using the light that is emitted when the excitons decay. The light from the light-emitting elements 22 is emitted in a light emission direction from the lower side toward the upper side in the drawing, centered on an optical axis orthogonal to the organic light-emitting layer.

The light-emitting elements 22 are, for example, produced on the substrate 21 using a semiconductor manufacturing process.

The electrodes of each light-emitting element 22 are connected to a drive circuit (not shown) through metal wiring formed on the substrate 21. The drive circuit controls the illumination and extinguishing of each light-emitting element 22 based on an image signal.

For example, the light-emitting elements 22 may include a first light-emitting element 22R that is illuminated in response to a red component image signal, a second light-emitting element 22G that is illuminated in response to a green component image signal, and a third light-emitting element 22B that is illuminated in response to a blue component image signal. The first light-emitting element 22R, the second light-emitting element 22G, and the third light-emitting element 22B are disposed inside each pixel that performs color display.

The color filter unit 23 is disposed in the light emission direction of each light-emitting element 22.

The color filter unit 23 includes a red filter that allows red light to be transmitted therethrough, a green filter that allows green light to be transmitted therethrough, and a blue filter that allows blue light to be transmitted therethrough. The red filter is disposed in a position facing the first light-emitting element 22R, the green filter is disposed in a position facing the second light-emitting element 22G, and the blue filter is disposed in a position facing the third light-emitting element 22B.

The color filter unit 23 may have a lens that collects the light that is transmitted through each red filter, each green filter, and each blue filter.

The optical film 10A of the present embodiment is laminated on the color filter unit 23 of the display unit 20. The optical film 10A improves the color purity in the display area of the display unit 20 and suppresses decrease in the display quality due to external light reflection.

The optical film 10A includes a colored layer 12, a transparent substrate 11, a hard coat layer 13, and a low refractive index layer 14A in this order in the light emission direction of the display unit 20.

The transparent substrate 11 is a plate or sheet having a first surface 11*a* and a second surface 11*b* in a thickness direction. The second surface 11*b* of the transparent substrate 11 is disposed on the color filter unit 23 side of the display unit 20 with the colored layer 12 therebetween. The transmittance of visible light through the material of the transparent substrate 11 is preferably as close to 100% as possible. Here, visible light is light in a visible wavelength band of 380 nm or more and 780 nm or less.

Further, the transparent substrate 11 has an ultraviolet absorption function with an ultraviolet blocking rate of 85% or more, and functions as an ultraviolet absorption layer for protecting the colored material contained in the colored layer 12 from ultraviolet light. Here, the ultraviolet blocking rate is measured and calculated based on JIS L 1925, and is expressed as a value [%] obtained by subtracting the average transmittance (unit: [%]) in the wavelength range from 290 nm to 400 nm from 100%.

Figure 2:
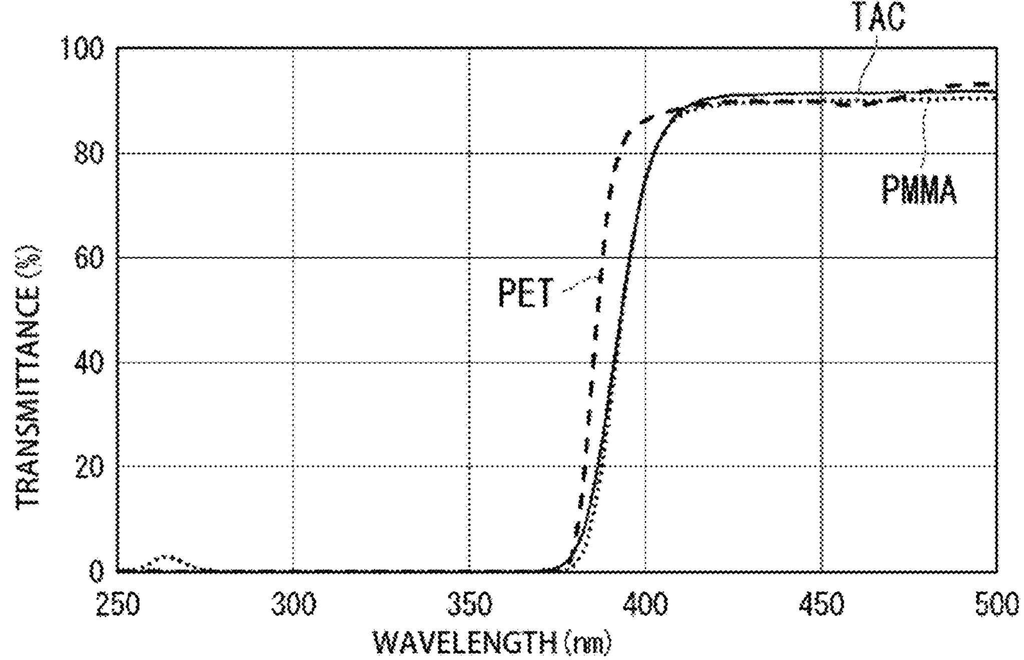
FIG. 2 is a graph showing an example of a light transmission profile of a transparent substrate used in the optical film.

As the material of the transparent substrate 11, polyolefins such as polyethylene and polypropylene, polyesters such as polybutylene terephthalate and polyethylene naphthalate, polyacrylates such as polymethyl methacrylate, polyamides such as nylon 6 and nylon 66, transparent resins such as polyimides, polyarylates, and polycarbonates, triacetylcellulose, polyvinyl alcohol, polyvinyl chloride, cycloolefin copolymers, norbornene-containing resins, polyethersulfones, and polysulfones, and inorganic glass can be used. Among these, a film made of polyethylene terephthalate (PET), a film made of triacetyl cellulose (TAC), a film made of polymethyl methacrylate (PMMA), and a film made of polyester can be preferably used. The thickness of the transparent substrate 11 is not particularly limited, but is preferably in a range of 10 μm to 100 μm. FIG. 2 shows the light transmission profile of a transparent substrate composed of these materials. In the example of FIG. 2, the ultraviolet blocking rate of each transparent substrate is as follows, and each of these can be preferably used as the transparent substrate 11.

TAC: 92.9%

PMMA: 93.4%

PET: 88.6%

The ultraviolet absorption properties of the transparent substrate 11 can be imparted, for example, by blending an ultraviolet absorber into the resin material for forming the transparent substrate 11. The ultraviolet absorber is not particularly limited, but benzophenone-based, benzotriazole-based, triazine-based, oxalic acid anilide-based, and cyanoacrylate-based compounds can be used.

The colored layer 12 is a layered portion containing a colored material, and is disposed by being stacked on the second surface 11*b* of the transparent substrate 11. As a result, the colored layer 12 is disposed between color filter unit 23 side of the display unit 20 and the transparent substrate 11.

The colored layer 12 contains a first colorant and a second colorant as the colored material.

The first colorant has a maximum absorption wavelength in a range of 470 nm or more and 530 nm or less, an absorption spectrum thereof having a half-width (full width at half maximum) of 15 nm or more and 45 nm or less. Here, the maximum absorption wavelength refers to the wavelength that, in a light absorption spectrum (absorption spectrum), gives the largest value among the maximum values of the light absorption. In a light transmittance spectrum, it refers to the wavelength that gives the smallest value among the minimum values. The same applies below.

The second colorant has a maximum absorption wavelength in a range of 560 nm or more and 620 nm or less, an absorption spectrum thereof having a half-width of 15 nm or more and 55 nm or less.

The colored layer 12 may be configured to include a third colorant that is different from the first colorant and the second colorant in order to adjust the color. As an example, the third colorant has, in a wavelength range of 400 nm or more and 780 nm or less, a wavelength of lowest transmittance in a range of 650 nm to 780 nm. The half-width of the absorption spectrum of the third colorant is, for example, 10 nm or more and 300 nm or less, but it is not particularly limited.

In the following description, the first colorant and the second colorant are sometimes collectively referred to simply as "colorants".

As the colorants contained in the colored layer 12, one or more compounds selected from a group consisting of compounds having one of a porphyrin structure, a merocyanine structure, a phthalocyanine structure, an azo structure, a cyanine structure, a squarylium structure, a coumarin structure, a polyene structure, a quinone structure, a tetradporphyrin structure, a pyrromethene structure, and an indigo structure, and metal complexes of these compounds may be used. For example, it is particularly preferable to use a compound having a porphyrin structure, a pyrromethene structure, a phthalocyanine structure, or a squarylium structure in the molecule.

Furthermore, in the optical film 10A of the present invention, when a D65 light source is irradiated from the side provided with the hard coat layer 13, which is a functional layer on the first surface 11*a* side of the transparent substrate 11, and the surface 10*a*, which is the outermost layer of the low refractive index layer 14A, when the reflectance R(λ) is measured from the surface 10*a* side in a case where complete diffuse reflection occurs on the bottom layer 10*b* side of the optical film, the hue values a* and b* of the optical film represented by formulas (1) to (9) above are each in a range of −5 or more and +5 or less. The hue mentioned above is one of the uniform color spaces (also referred to as a CIE 1976 L*, a*, b* color space or CIE LAB color space) defined by the Commission Internationale de l'Eclairage (CIE), and is represented by three-dimensional orthogonal coordinates with axes corresponding to the three values obtained from formula (1), formula (2), and also a brightness index L* represented by formula (10) below.

[Math. 10]

$$L^* = 116\times\left(\frac{Y}{Y_n}\right)^{\frac{1}{3}} - 16 \tag{10}$$

Here, Y is a tristimulus value of the reflected light at the reflectance R(λ) of a D65 light source, which is calculated from equations (4), (5), (7), and (9), and Yn is the tristimulus value at the white point of a D65 light source.

Figure 3:
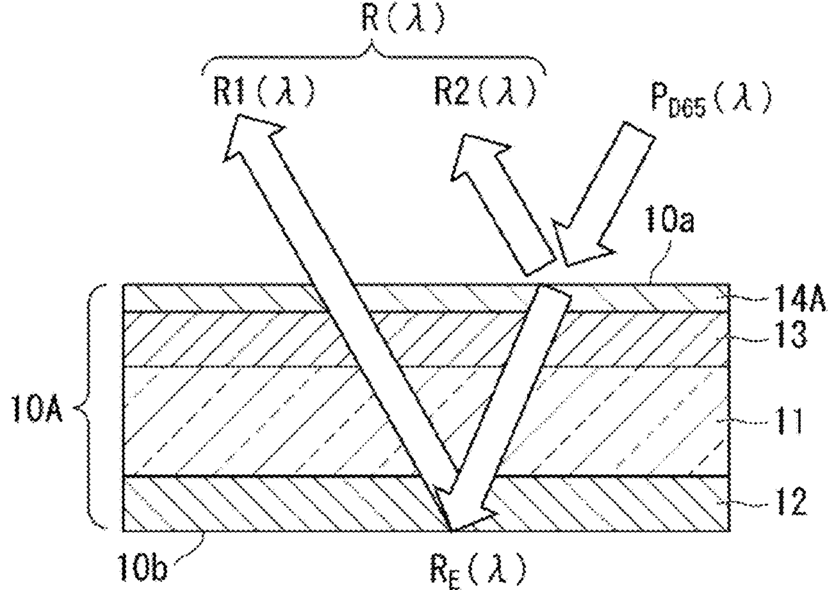
FIG. 3 is an explanatory diagram of a calculation method of reflection hue values a* and b* of an optical film of the present invention.

The method for calculating a* and b*, which are values used as indicators of the external light reflection hue of the optical film of the present invention, will be described in detail using FIG. 3.

When a D65 light source is irradiated from the surface 10*a*, which is the outermost layer of the functional layer of the optical film 10A in the thickness direction, the light emitted from the optical film 10A can be considered to be divided into a surface reflection component and an internal reflection component. The surface reflection component is defined by the surface reflectance at the surface 10*a* by R2(λ) [%]. The internal reflection component is defined by R1(λ) [%], which is calculated by equation (4) from the reflectance RE(λ) [%] at the completely diffuse reflection surface, which is assumed to be 100% regardless of the wavelength, the transmittance T(λ) of the optical film 10A, and the surface reflectance R2(λ) [%] at the surface 10*a*.

When the reflectance of the optical film 10A on the surface 10*a* side, which is the side irradiated by a D65 light source, is R(λ) [%], R(λ) is calculated from equation (5) above.

R(λ), like R1(λ) and R2(λ), is a function of the wavelength λ, and therefore, the tristimulus values X, Y, and Z are found by calculating the definite integral with respect to λ in equations (6) to (9). Here, the definite integral may be calculated by an appropriate numerical integration. For example, when performing the numerical integration, the wavelength interval may be an equal interval such as a 1 nm interval.

As mentioned above, X, Y, and Z in equations (1) and (2) are tristimulus values of the reflected light at the reflectance R(λ) of a D65 light source on the surface 10*a* side of the optical film 10A, and $X_n$, $Y_n$, and $Z_n$ represent the tristimulus values at the white point of a D65 light source. From this, a* and b*, which are indicators of the external light reflection hue of the optical film 10A, can be calculated. From the viewpoint of enhancing the display quality of the external light reflection, it is preferable that the external light reflection hue values a* and b* of the optical film 10A are each in a range of −5 or more and +5 or less. The internal reflectance that occurs at an internal surface such as the display unit or an electrode wiring portion of a self-luminous display device such as an organic light-emitting display device generally has a different value at each wavelength from a wavelength of 380 nm to 780 nm. However, as a result of intensive studies in the present invention, it has been found that when REQ) which is the reflectance at a completely diffuse reflectance surface is set to 100% at every wavelength, and the external light reflection hue values a* and b* of the optical film 10A are each in a range of −5 or more and +5 or less, the values of a* and b*, which are indicators of the external light reflection hues, are in a range of −5 or more and +5 or less even when REQ) is replaced with the internal reflectance of the display unit 20 of a self-luminous display device, and superior image quality can be obtained.

According to the colored layer 12 having such a configuration, as a whole, because the maximum absorption wavelength, that is, the minimum transmittance, is in a range of 470 nm or more and 530 nm or less and a range of 560 nm or more and 620 nm or less, a spectral absorption spectrum is obtained which has the minimum absorption wavelength, that is, the maximum transmittance, in a range of 620 nm or more and 780 nm or less. Consequently, a large portion of the red light, green light, and blue light emitted from the display unit 20 passes through the colored layer 12.

In contrast, in the colored layer 12, the amount of transmitted light of a wavelength component between the maximum wavelengths of the red light and the green light, a wavelength component between the maximum wavelengths of the green light and blue light, and a portion of each of ultraviolet light and infrared light decreases. As a result, for example, of the external light that is reflected by the wires of the display unit 20 and the like, wavelength components that decrease the color purity of the display light are absorbed by the colored layer 12.

The colored layer 12 may contain, as an additive, at least one of a radical scavenger, a peroxide decomposer, and a singlet oxygen quencher. As a result of such an additive being included, as described below, fading of the colorants contained in the colored layer 12 due to light, heat, and the like, can be suppressed, and the durability can be improved.

For example, a radical scavenger has the function of capturing radicals when a colored material undergoes oxidative deterioration, and suppressing autooxidation, which suppresses the decomposition (fading) of the colored material. When a hindered amine-based light stabilizer (HALS) having a molecular weight of 2,000 or more is used as a radical scavenger, a high fading suppression effect can be obtained. When the molecular weight of the radical scavenger is low, it tends to volatilize, which causes fewer molecules to remain in the colored layer, and makes it difficult to obtain a sufficient fading suppression effect. Examples of materials preferably used as the radical scavenger include Chimassorb (registered trademark) 2020FDL, Chimassorb (registered trademark) 944FDL, and Tinuvin (registered trademark) 622 manufactured by BASF, and LA-63P manufactured by ADEKA Corporation.

A peroxide decomposer has the function of decomposing peroxide generated when a colored material undergoes oxidative deterioration, stopping the autooxidation cycle, and suppressing deterioration (fading) of the colored material. As the peroxide decomposer, phosphorus-based antioxidants and sulfur-based antioxidants can be used.

Examples of phosphorus-based antioxidants include 2,2'-methylenebis(4,6-di-t-butyl-1-phenyloxy)(2-ethylhexyloxy) phosphorus, 3,9-bis(2,6-di-tert-butyl-4-methylphenoxy)-2,4,8,10-tetraoxa-3,9-diphosphaspiro[5.5]undecane, and 6-[3-(3-t-butyl-4-hydroxy-5-methylphenyl)propoxy]-2,4,8,10-tetra-t-butyldibenz[d,f][1,3,2]dioxaphosphepine.

Examples of sulfur-based antioxidants include 2,2-bis({[3-(dodecylthio)propionyl]oxy}methyl)-1,3-propanediyl-bis[3-(dodecylthio)propionate], 2-mercaptobenzimidazole, dilauryl-3,3'-thiodipropionate, dimyristyl-3,3'-thiodipropionate, di stearyl-3,3'-thiodipropionate, pentaerythrityl-tetrakis(3-laurylthiopropionate) and 2-mercaptobenzothiazole.

A singlet oxygen quencher has the function of deactivating highly reactive singlet oxygen, which tends to cause oxidative deterioration (fading) of a colored material, and suppressing oxidative deterioration (fading) of a colored material. Examples of singlet oxygen quenchers include transition metal complexes, colored materials, amines, phenols, and sulfides, and particularly preferably used materials include transition metal complexes of dialkyl phosphate, dialkyl dithiocarbanate, or benzenedithiol, with nickel, copper, or cobalt preferably used as the central metal. Examples include NKX1199, NKX113, and NKX114 manufactured by Hayashibara Biochemical Research Institute for Photosensitizing Dyes Co., and D1781, B1350, B4360, and T3204 manufactured by Tokyo Kasei Co., Ltd.

Although the colorants contained in the colored layer 12 have an excellent color correction function, they do not have sufficient resistance to light, and in particular, ultraviolet light, so when irradiated with ultraviolet light, they deteriorate over time and become unable to absorb light near the maximum absorption wavelength.

In the present embodiment, in the optical film 10A, because the transparent substrate 11 having an ultraviolet blocking rate of 85% or more is disposed in front of the colored layer 12 on the side at which external light enters, the amount of ultraviolet light contained in the external light that enters the colored layer 12 can be suppressed. Therefore, the lightfastness of the colored layer 12 to ultraviolet light can be improved.

In the example shown in FIG. 1, although the colored layer 12 is directly formed on the transparent substrate 11 having an ultraviolet absorption function, other layers may be disposed between the transparent substrate 11 and the colored layer 12 as long as the transparent substrate 11 is disposed further toward the side at which external light enters than the colored layer 12.

Furthermore, the hard coat layer 13 can be provided as a functional layer in the present embodiment. The hard coat layer 13 is a layered portion that has light transmittance and protects the transparent substrate 11 from external forces. The transmittance of the hard coat layer 13 with respect to visible light is preferably close to 100%.

In addition, the surface hardness of the optical film 10A on which the hard coat layer 13 is disposed is H or higher in terms of pencil hardness under a load of 500 gf (4.9 N) (hereinafter referred to as a 500 g load), where the pencil hardness is measured based on JIS-K5600-5-4:1999.

The hard coat layer 13 is formed by applying a composition containing an active energy ray-curable resin, a photopolymerization initiator, and a solvent, and then drying and curing the composition by irradiation with energy rays such as ultraviolet light.

The active energy ray-curable resin is a resin that is polymerized and cured by irradiation of an active energy ray such as ultraviolet light or an electron beam, and for example, monofunctional, difunctional, trifunctional or higher (meth)acrylate monomers can be used. Note that, in the present specification, "(meth)acrylate" is a general term for both acrylate and methacrylate, and "(meth)acryloyl" is a general term for both acryloyl and methacryloyl.

Examples of monofunctional (meth)acrylate compounds include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloylmorpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth) acrylate, 3-methoxybutyl (meth)acrylate, ethyl carbitol (meth)acrylate, phosphate (meth)acrylate, ethylene-oxide-modified phosphate (meth)acrylate, phenoxy (meth)acrylate, ethylene-oxide-modified phenoxy (meth)acrylate, propylene-oxide-modified phenoxy (meth)acrylate, nonyl phenol (meth)acrylate, ethylene-oxide-modified nonyl phenol (meth)acrylate, propylene-oxide-modified nonyl phenol (meth)acrylate, methoxy diethylene glycol (meth)acrylate, methoxy polyethylene glycol (meth)acrylate, methoxy propylene glycol (meth)acrylate, 2-(meth)acryloyl oxyethyl-2-hydroxy propyl phthalate, 2-hydroxy-3-phenoxy propyl (meth)acrylate, 2-(meth)acryloyl oxyethyl hydrogen phthalate, 2-(meth)acryloyl oxypropyl hydrogen phthalate, 2-(meth)acryloyl oxypropyl hexahydro hydrogen phthalate, 2-(meth)acrylol oxypropyl tetrahydro hydrogen phthalate, dimethylaminoethyl (meth)acrylate, trifluoroethyl (meth) acrylate, tetrafluoropropyl (meth)acrylate, hexafluoropropyl (meth)acrylate, octafluoropropyl (meth)acrylate, 2-adamantane, and adamantine derivatives of mono(meth)acrylate, such as adamantyl acrylate having a monovalent mono (meth)acrylate derived from adamantine diol.

Examples of bifunctional (meth)acrylate compounds include di(meth)acrylates, such as ethylene glycol di(meth) acrylate, diethylene glycol di(meth)acrylate, butanediol di(meth)acrylate, hexanediol di(meth)acrylate, nonane diol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxy pivalate neopentyl glycol di(meth)acrylate.

Examples of trifunctional or higher (meth)acrylate compounds include tri(meth)acrylates, such as trimethylolpropane tri(meth)acrylate, ethoxylated trimethylolpropane tri (meth)acrylate, propoxylated trimethylolpropane tri(meth) acrylate, tris 2-hydroxyethyl isocyanurate tri(meth)acrylate, and glycerin tri(meth)acrylate; trifunctional (meth)acrylate compounds, such as pentaerythritol tri(meth)acrylate, dipentaerythritol tri(meth)acrylate, and ditrimethylolpropane tri (meth)acrylate; trifunctional or higher polyfunctional (meth) acrylate compounds, such as pentaerythritol tetra(meth) acrylate, ditrimethylolpropane tetra(meth)acrylate, dipentaerythritol tetra(meth)acrylate, dipentaerythritol penta (meth)acrylate, ditrimethylolpropane penta(meth)acrylate, dipentaerythritol hexa(meth)acrylate, and ditrimethylolpropane hexa(meth)acrylate; and polyfunctional (meth)acrylate compounds in which a part of each of these (meth)acrylates is replaced by an alkyl group or ε-caprolactone.

Furthermore, urethane (meth)acrylate can be used as the active energy ray-curable resin. Examples of urethane (meth)acrylates include those obtained by reacting a (meth) acrylate monomer having a hydroxyl group with a product obtained by reacting a polyester polyol with an isocyanate monomer or prepolymer.

Examples of urethane (meth)acrylates include pentaerythritol triacrylate hexamethylene diisocyanate urethane prepolymer, dipentaerythritol pentaacrylate hexamethylene diisocyanate urethane prepolymer, pentaerythritol triacrylate toluene diisocyanate urethane prepolymer, dipentaerythritol pentaacrylate toluene diisocyanate urethane prepolymer, pentaerythritol triacrylate isophorone diisocyanate urethane prepolymer, and dipentaerythritol pentaacrylate isophorone diisocyanate urethane prepolymer.

The active energy ray-curable resins described above may be used alone or in combination of two or more. Furthermore, the active energy ray-curable resins described above may be a monomer in the composition for forming a hard coat layer, or may be a partially polymerized oligomer.

The photopolymerization initiator only needs to generate radicals when irradiated with ultraviolet light, and specific examples include acetophenone-based compounds, benzoin-based compounds, benzophenone-based compounds, oxime ester-based compounds, thioxanthone-based compounds, triazine-based compounds, phosphine-based compounds, quinone-based compounds, borate-based compounds, carbazole-based compounds, imidazole-based compounds, and titanocene-based compounds. For example, 2,2-ethoxyacetophenone, 1-hydroxycyclohexylphenyl ketone, dibenzoyl, benzoin, benzoin methyl ether, benzoin ethyl ether, p-chlorobenzophenone, p-methoxybenzophenone, Michler's ketone, acetophenone, 2-chlorothioxanthone, diphenyl (2,4,6-trimethylbenzoyl)phosphine oxide, and phenylbis(2,4,6-trimethylbenzoyl)phosphine oxide can be used. One of these types may be used alone, or two or more types may be used in combination.

Examples of the solvent include ethers such as dibutyl ether, dimethoxymethane, dimethoxyethane, diethoxyethane, propylene oxide, 1,4-dioxane, 1,3-dioxolane, 1,3,5-trioxane, tetrahydrofuran, anisole, and phenetole, ketones such as acetone, methyl ethyl ketone, diethyl ketone, dipropyl ketone, diisobutyl ketone, methyl isobutyl ketone, cyclopentanone, cyclohexanone, methylcyclohexanone, and methylcyclohexanone, esters such as ethyl formate, propyl formate, n-pentyl formate, methyl acetate, ethyl acetate, methyl propionate, ethyl propionate, n-pentyl acetate, and γ-butyrolactone, and cellosolves such as methyl cellosolve, cellosolve, butyl cellosolve, and cellosolve acetate. These may be used alone or in combination of two or more.

Furthermore, the composition for forming the hard coat layer 13 may contain metal oxide fine particles for the purpose of adjusting the refractive index and imparting hardness. Examples of metal oxide fine particles include zirconium oxide, titanium oxide, niobium oxide, antimony trioxide, antimony pentoxide, tin oxide, indium oxide, indium tin oxide, and zinc oxide.

Moreover, the composition for forming the hard coat layer 13 may include any of silicon oxide, a fluorine-containing silane compound, a fluoroalkylsilazane, a fluoroalkylsilane, a fluorine-containing silane compound, and a perfluoropolyether group-containing silane coupling agent that imparts at least either water repellency or oil repellency, and enhances the stain resistance.

In addition, other additives such as a leveling agent, an antifoaming agent, a photosensitizer, and a conductive material such as quaternary ammonium cations or conductive metal fine particles may be added to the composition for forming the hard coat layer 13. The conductive material imparts antistatic properties to the optical film.

Furthermore, the low refractive index layer 14A can be provided as a functional layer in the present embodiment. When the optical film 10A is applied to the display device 50A, the low refractive index layer 14A is disposed on the side nearest the user (viewer) that views the display. In the present embodiment, the low refractive index layer 14A is laminated on the surface on the opposite side of the hard coat layer 13 to the transparent substrate 11. The layer thickness of the low refractive index layer 14 is not particularly limited, but is preferably 40 nm to 1 μm.

The low refractive index layer 14A is composed of a material having a lower refractive index than the hard coat layer 13. As a result, the reflected light at the interface with the hard coat layer 13, which is from externally-incident light, and the reflected light at the surface of the low refractive index layer 14A create interference, which reduces the surface reflectance of the external light.

Because the surface reflection of the external light can be suppressed by providing the low refractive index layer 14A, the visibility of the display device 50A is improved.

The low refractive index layer 14A is a layered portion composed of an inorganic substance or an inorganic compound. Examples of inorganic substances and inorganic compounds include fine particles of LiF, MgF, 3NaF·AlF, AlF, $Na3AlF_6$, and silica fine particles. Furthermore, as the silica fine particles, the use of fine particles having voids inside the particles, such as porous silica fine particles or hollow silica fine particles, is effective for lowering the refractive index. Moreover, in addition to inorganic substances and inorganic compounds, an active energy ray-curable resin, a photopolymerization initiator, a solvent, or other additives described for the hard coat layer 13 may be blended as appropriate into the composition for forming the low refractive index layer 14A.

The composition for forming the low refractive index layer 14 may include any of silicon oxide, a fluorine-containing silane compound, a fluoroalkylsilazane, a fluoroalkylsilane, a fluorine-containing silane compound, and a perfluoropolyether group-containing silane coupling agent. As a result of including these materials, at least one of the water repellency and the oil repellency is imparted to the low refractive index layer 14, and the antifouling properties can be enhanced.

The colored layer 12 is a layered portion having one or more layers formed on the second surface 11*b* side of the transparent substrate 11, and the composition for forming the colored layer 12 contains an active energy ray-curable resin, a photopolymerization initiator, a colored material, and a solvent. It is possible to use the same active energy ray-curable resins, photopolymerization initiators, and solvents as those described for the hard coat layer 13.

The colored material includes at least either the first colorant and the second colorant mentioned above, and the third colorant. The additive includes at least one of a radical scavenger, a peroxide decomposer, and a singlet oxygen quencher.

The optical film 10A contains a black organic pigment in at least one of the functional layer and the colored layer 12. In a configuration in which a plurality of functional layers are provided, two or more of the functional layers may contain a black organic pigment.

Preferable examples of the black organic pigment include bisbenzofuranone compounds, azomethine compounds, perylene compounds, and azo compounds.

In the present specification, carbon black is not included among the black organic pigments. According to studies conducted by the inventors, it has been found that the use of carbon black is undesirable because the haze value of the coating film increases due to problems with compatibility with the resin with the resin.

The optical film 10A can be produced by forming the colored layer 12 on the second surface 11*b* of the transparent substrate 11, and forming the hard coat layer 13 and the low refractive index layer 14A on the first surface 11*a* of the transparent substrate 11 in this order. However, the order in which the colored layer 12, the hard coat layer 13 and the low refractive index layer 14A are formed is not particularly limited. For example, the hard coat layer 13 and the low refractive index layer 14A may be formed after firstly forming the colored layer 12, and may also be formed in the reverse order. The colored layer 12, the hard coat layer 13, and the low refractive index layer 14A can be formed by applying a coating solution containing the constituent materials of each layer, and then drying and curing the coating solution by irradiation of active energy ray-curable resin such as ultraviolet light. In addition, the low refractive index layer 14A can also be formed, for example, by vapor deposition or sputtering.

Furthermore, the optical film 10A of the present embodiment may be provided with another functional layer as appropriate on the first surface 11*a* side of the transparent substrate 11 of the optical film as long as the required front brightness, external light reflection visibility, and color purity of the display light can be obtained, and a black organic pigment can be contained in such a functional layer.

The optical film 10A is capable of reducing the content of the colorant as a result of at least one of the colored layer and the functional layer containing a black organic pigment. Consequently, there is no significant loss in terms of the reflection suppression, luminance efficiency, and reliability.

The display device 50A can be produced by preparing the display unit 20, and then bonding and fixing the colored layer 12 of the optical film 10A to the surface of the color filter unit 23 via an adhesive layer or the like.

According to the display device 50A of the present embodiment, when the light-emitting element 22 is illuminated according to an image signal, the display light generated by the light-emitting element 22 is transmitted through the color filter unit 23. As a result, light from the first light-emitting element 22R is emitted as red light, light from the second light-emitting element 22G is emitted as green light, and light from the third light-emitting element 22B is emitted as blue light to the outside of the optical film 10A by being transmitted through the colored layer 12, the transparent substrate 11, the hard coat layer 13, and the low refractive index layer 14A.

At this time, the colored layer 12 has a wavelength band in which the red, green, and blue wavelength light of the display light has good transmittance, which enables a decrease in the brightness of the display light of each color to be suppressed, and the color purity of the display light of each color to be improved. Furthermore, because light in the ultraviolet region is mainly absorbed in the transparent substrate 11, the display light is transmitted with almost no reduction in brightness. Because the low refractive index layer 14 has good transmittance with respect to visible light, the display light is externally emitted with almost no reduction in brightness.

On the other hand, external light enters the display device 50A through the optical film 10A.

Because the surface reflectance of external light is suppressed by the low refractive index layer 14A, decrease in visibility due to the surface reflection of external light being too strong is suppressed.

The external light that enters the transparent substrate 11 enters the colored layer 12 in a state where the wavelength component in the ultraviolet region has been absorbed by the transparent substrate 11.

In the colored layer 12, the wavelength components of the external light that are near the absorption wavelengths of each colorant contained in the colored layer 12 are further absorbed. Then, the external light is transmitted through the color filter unit 23 and reaches the substrate 21. The substrate 21 includes metal components with a high reflectivity, such as wires and electrodes.

As a result, external light is reflected by the wires and electrodes and the like, is successively transmitted through the color filter unit 23, the colored layer 12, the transparent substrate 11, the hard coat layer 13, and the low refractive index layer 14A, and then emitted externally.

An observer of the display device 50A sees, in addition to the display light, reflected light that is a combination of the surface reflected light due to the external light of the display device 50A and internally reflected light in which the external light is transmitted inside the display device 50A and then reflected.

In the present embodiment, because the external light is transmitted twice through the colored layer 12 and then emitted externally, the wavelength components that are different to the wavelength components of the display light are reduced, which reduces the internal reflection of the external light while also allowing a decrease in the brightness of the display light to be suppressed, and improves the color purity of the display light.

Furthermore, even when the display device 50A is in a non-display state, by setting the values of a* and b*, which are indicators of the reflection hue of the external reflection light of the optical film 10A, to −5 or more and +5 or less, the influence of the color of the optical film is reduced and the blackness of the display screen is maintained.

In the present embodiment, because the ultraviolet light component of the external light is absorbed by the transparent substrate 11, deterioration of the colorants due to the colored layer 12 being exposed to ultraviolet light is prevented. As a result, the spectral characteristics of the colorants in the colored layer 12 can be more easily maintained over time.

Second Embodiment

An optical film and a display device according to a second embodiment of the present invention will be described.

Figure 4:
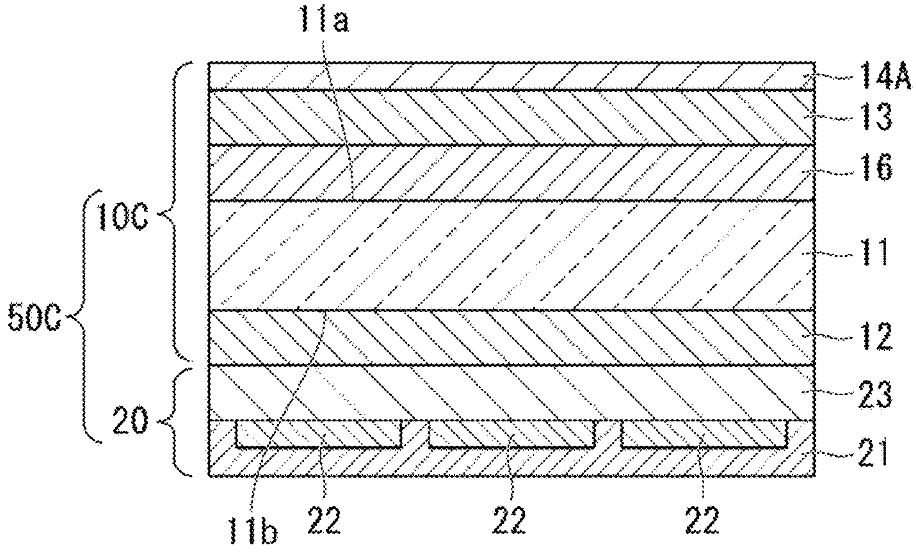
FIG. 4 is a schematic cross-sectional view showing an example of an optical film and a display device according to a second embodiment of the present invention.

FIG. 4 is a schematic cross-sectional view showing an example of an optical film and a display device according to the present embodiment.

A display device 50C of the present embodiment, whose cross-section in the thickness direction is shown in FIG. 4, includes an optical film 10C of the present embodiment instead of the optical film 10A of the display device 50A of the first embodiment.

Except for being provided with an oxygen barrier layer 16 between the colored layer 12 and the hard coat layer 13, the optical film 10C is configured in the same manner as the optical film 10A.

The following description will be focused on the differences from the first embodiment.

The oxygen barrier layer 16 is a transparent layer that transmits light. For example, the oxygen barrier layer 16 has an oxygen permeability of 10 cc/m2·day·atm or less. As the main constituent materials of the oxygen barrier layer 16, it is preferable to include polyvinyl alcohol (PVA), ethylene-vinyl alcohol copolymer (EVOH), vinylidene chloride, siloxane resin, and the like, and MAXIVE (registered trademark) manufactured by Mitsubishi Gas Chemical Co., Ltd., EVAL (registered trademark) and POVAL manufactured by Kuraray Co., Ltd., Saran latex (registered trademark) and Saran (registered trademark) resin manufactured by Asahi Kasei Corporation, and the like can be used. Furthermore, inorganic particles such as silica particles, alumina particles, silver particles, copper particles, titanium particles, zirconia particles, and tin particles may be dispersed in the oxygen barrier layer 16 in order to reduce the oxygen permeability.

When the optical film 10C is attached to the display device 50C, the oxygen contained in the outside air can not reach the colored layer 12 unless it passes through the oxygen barrier layer 16. This suppresses deterioration of each colorant in the colored layer 12 caused by light or heat mediated by the oxygen in the outside air. As a result, the light absorption performance of the colored layer 12 is maintained for a long time.

The oxygen barrier layer 16 of the present embodiment can be disposed on an appropriate part where suppression of the entry of oxygen is desired.

For example, when suppression of the entry of oxygen into the colored layer 12 from outside the display device 50B is desired, the oxygen barrier layer 16 can be appropriately disposed between the members or between the layers on the side further toward the outside of the colored layer 12.

For example, when suppression of the entry of oxygen into the colored layer 12 from the display unit 20 of the display device 50B is desired, the oxygen barrier layer 16 can also be disposed between the color filter unit 23 and the colored layer 12.

The optical film 10C of the present embodiment and the display device 50C include the same colored layer 12, hard coat layer 13, and low refractive index layer 14A as the first embodiment, which provides the same functions and effects as the first embodiment.

In particular, because the optical film 10C of the present embodiment further includes the oxygen barrier layer 16, oxidative deterioration caused by light and heat due to the influence of oxygen on the colored material of the colored layer 12 can be suppressed.

Third Embodiment

An optical film and a display device according to a third embodiment of the present invention will be described.

Figure 5:
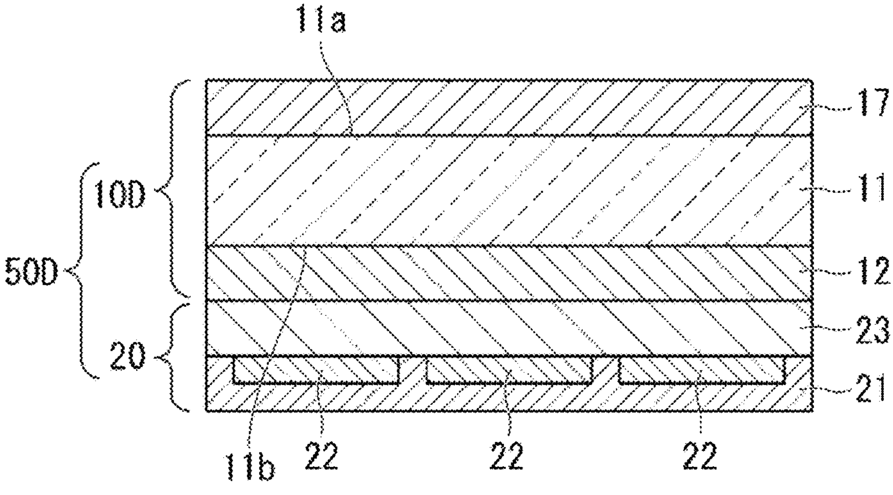
FIG. 5 is a schematic cross-sectional view showing an example of an optical film and a display device according to a third embodiment of the present invention.

FIG. 5 is a schematic cross-sectional view showing an example of an optical film and a display device according to the present embodiment.

A display device 50D of the present embodiment, whose cross-section in the thickness direction is shown in FIG. 5, includes an optical film 10D of the present embodiment instead of the optical film 10A of the display device 50A of the first embodiment.

The optical film 10D has the same configuration as the optical film 10A except that an antiglare layer 17 is provided instead of the low refractive index layer 14A and the hard coat layer 13.

The following description will be focused on the differences from the first embodiment.

The antiglare layer 17 is a layered portion having an antireflective function.

The antireflective function is a function provided by fine irregularities on a surface, and reduces glare of the external light as a result of the irregularities scattering the external light. The pencil hardness of the surface of the optical film 10D provided with the antiglare layer 17 is, like the pencil hardness of the optical film 10A of the first embodiment, H or higher.

The antiglare layer 17 can be formed by curing a coating liquid containing, in addition to the same composition as the hard coat layer 13, at least one of organic fine particles and inorganic fine particles that impart an antireflective function. The organic fine particles form fine irregularities on the surface of the antiglare layer 17 and impart a function that diffuses external light, and for example, resin particles composed of a translucent resin material such as acrylic resin, polystyrene resin, styrene-(meth)acrylate copolymer, polyethylene resin, epoxy resin, silicone resin, polyvinylidene fluoride, and polyethylene fluoride resin can be used. In order to adjust the refractive index and the dispersibility of the resin particles, two or more types of resin particles having different material characteristics (refractive indexes) may be mixed and used. The inorganic fine particles are used to control sedimentation and aggregation of the organic fine particles in the antiglare layer 17, and silica fine particles, metal oxide fine particles, various mineral fine particles, and the like, can be used. As the silica fine particles, for example, colloidal silica, silica fine particles surface-modified with a reactive functional group such as a (meth)acryloyl group, and the like, can be used. As the metal oxide fine particles, for example, alumina, zinc oxide, tin oxide, antimony oxide, indium oxide, titania, zirconia, and the like, can be used. As the mineral fine particles, mica, synthetic mica, vermiculite, montmorillonite, iron-montmorillonite, bentonite, beidellite, saponite, hectorite, stevensite, nontronite, magadiite, ilerite, kanemite, layered titanate, smectite, and synthetic smectite can be used. The mineral fine particles may be either a natural product or a synthetic product (including substituted products and derivatives), and a mixture of both may be used. Among the mineral fine particles, layered organic clay is more preferable. Layered organic clay refers to a swellable clay in which organic onium ions are introduced between the layers. The organic onium ion is not limited as long as it can be organicized using the cation exchange properties of the swellable clay. When using a layered organic clay mineral as the mineral fine particles, synthetic smectite can be preferably used as mentioned above.

Synthetic smectite has the function of increasing the viscosity of the coating solution for forming the antiglare layer, suppressing sedimentation of the resin particles and the inorganic fine particles, and adjusting the irregular shape of the surface of the optical functional layer.

The composition for forming the antiglare layer 17 may include any of silicon oxide, a fluorine-containing silane compound, a fluoroalkylsilazane, a fluoroalkylsilane, a fluorine-containing silane compound, and a perfluoropolyether group-containing silane coupling agent. These materials impart at least one of water repellency and oil repellency to the antiglare layer 17, and can enhance the antifouling properties of the optical film 10D.

The antiglare layer 17 may also be formed as a structure in which a layer having a relatively high refractive index and a layer having a relatively low refractive index are laminated in order from the first surface 11*a* side. An antiglare layer 17 in which materials are unevenly distributed can, for example, be formed by coating a composition containing a low refractive index material containing surface-modified silica fine particles or hollow silica fine particles, and a high refractive index material, and inducing a phase separation using a difference in the surface free energies of the two materials. When the antiglare layer 17 is composed of two phase-separated layers, it is preferable that the layer having the relatively high refractive index closer to the transparent substrate 11 has a refractive index of 1.50 to 2.40, and the layer having the relatively low refractive index on the surface side of the optical film 10D has a refractive index of 1.20 to 1.55.

The optical film 10D of the present embodiment and the display device 50D include the same colored layer 12 and transparent substrate 11 as the first embodiment, which provides the same functions and effects as the first embodiment.

In particular, because the optical film 10D of the present embodiment includes the antiglare layer 17, external light is scattered in the antiglare layer 17. Consequently, surface reflection and glare of external light are suppressed, which improves the visibility of the display screen and the display light, and suppresses a decrease in the display quality due to external light reflection.

Fourth Embodiment

An optical film and a display device according to a fourth embodiment of the present invention will be described.

Figure 6:
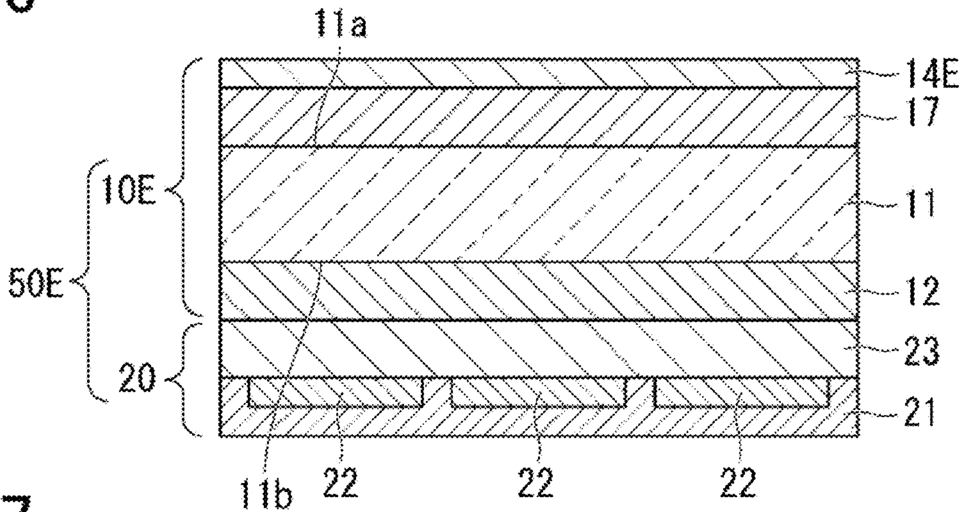
FIG. 6 is a schematic cross-sectional view showing an example of an optical film and a display device according to a fourth embodiment of the present invention.

FIG. 6 is a schematic cross-sectional view showing an example of an optical film and a display device according to a fourth embodiment of the present invention.

A display device 50E of the present embodiment, whose cross-section in the thickness direction is shown in FIG. 6, includes an optical film 10E of the present embodiment instead of the optical film 10D of the display device 50D of the third embodiment.

The optical film 10E has the same configuration as the optical film 10D, except that a low refractive index layer 14E is laminated on the antiglare layer 17.

The following description will be focused on the differences from the third embodiment.

The low refractive index layer 14E is the same as the low refractive index layer 14A of the first embodiment, except that it has a refractive index lower than the refractive index of the antiglare layer 17.

As a result, the reflected light at the interface with the antiglare layer 17, which is from external light incident from the outside, and the reflected light at the surface of the low refractive index layer 14E create interference, which reduces the reflectance of the external light.

Because the reflection of external light can be suppressed by providing the low refractive index layer 14E, the visibility of the display device 50E is improved.

The optical film 10E of the present embodiment and the display device 50E include the same colored layer 12 and antiglare layer 17 as the third embodiment, which provides the same functions and effects as the third embodiment.

Specifically, the optical film 10E of the present embodiment has the low refractive index layer 14E on the outside, thereby suppressing surface reflection and glare of external light, which improves the visibility of the display screen and the display light, and suppresses decrease in display quality due to external light reflection.

In the embodiments and modifications described above, although an example has been described in which the light-emitting element is an organic EL element, the type of light-emitting element is not limited to an organic EL element. For example, examples of light-emitting elements include white LED elements, inorganic phosphor light-emitting elements, and quantum dot light-emitting elements. When the light source emits monochromatic light of the three primary colors RGB, the display unit 20 may be configured without the color filter unit 23.

In the embodiments and modifications described above, although a configuration has been described in which the optical film has various functional layers other than the color layer, such as the low refractive index layer, the hard coat layer, the oxygen barrier layer, and the antiglare layer, the configuration of the functional layers of the optical film is not limited to this.

For example, the optical film may have a water-repellent antifouling layer or an antistatic layer containing a conductive material. Furthermore, the functional layers described above may be a layered portion provided with two or more functions of the functional layers.

In the embodiments and modifications described above, an example of a case where at least the transparent substrate has an ultraviolet absorption property has been described. However, the optical film may further include an ultraviolet absorption layer having an ultraviolet absorption function. In the optical film, the colored layer or a functional layer other than the colored layer may also serve as the ultraviolet absorption layer.

For example, the ultraviolet absorption layer may be disposed further toward the outside than the layered portion in which prevention of irradiation with ultraviolet light is desired. In this case, the layered portion further toward the inside can be protected from ultraviolet light irradiated from the outside of the optical film.

The optical film according to the present invention will be described in further detail using Examples and Comparative Examples. The technical idea according to the present invention is not limited to just the specific content of each embodiment.

Table 1 shows the layer configuration of each Example. When a plurality of functional layers are provided, layers having higher numbers are closer to the transparent substrate.

TABLE 1

| | Ex. 1 | Ex. 2 | Ex. 3 | Ex. 4 | Ex. 5 | Ex. 6 | Ex. 7 |
|---|---|---|---|---|---|---|---|
| Functional layer 1 | Hard coat layer 1 | Low refractive index layer | Low refractive index layer | Low refractive index layer | Low refractive index layer | Low refractive index layer | Low refractive index layer |
| Functional layer 2 | | Hard coat layer 1 | Hard coat layer 1 | Hard coat layer 1 | Hard coat layer 1 | Hard coat layer 1 | Hard coat layer 1 |
| Functional layer 3 | — | — | — | — | — | — | — |
| Transparent substrate | TAC | TAC | TAC | TAC | TAC | PMMA | PET1 |
| Colored layer | Colored layer 1 | Colored layer 1 | Colored layer 2 | Colored layer 3 | Colored layer 4 | Colored layer 4 | Colored layer 4 |

| | Ex. 8 | Ex. 9 | Ex. 10 | Ex. 11 | Ex. 12 | Ex. 13 |
|---|---|---|---|---|---|---|
| Functional layer 1 | Low refractive index layer | Atireflective layer | Low refractive index layer | Low refractive index layer | Low refractive index layer | Low refractive index layer |
| Functional layer 2 | Hard coat layer 1 | — | Anti-glare layer | Hard coat layer 2 | Hard coat layer 1 | Hard coat layer 1 |
| Functional layer 3 | — | — | — | — | — | Oxygen barrier layer |
| Transparent substrate | PET2 | TAC | TAC | TAC | TAC | TAC |
| Colored layer | Colored layer 4 | Colored layer 4 | Colored layer 4 | Colored layer 5 | Colored layer 6 | Colored layer 1 |

-

Table 2 shows the layer configuration of each Comparative Example. In Comparative Examples 1 to 3, the colored layer is formed on the second surface side of the transparent substrate, and the functional layers are formed thereon.

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Functional layer 1 | Low refractive index layer | Low refractive index layer | Low refractive index layer | Low refractive index layer | Low refractive index layer | Low refractive index layer | Low refractive index layer |
| Functional layer 2 | Hard coat layer 1 | Hard coat layer 1 | Hard coat layer 3 | Hard coat layer 1 | Hard coat layer 1 | Hard coat layer 1 | Hard coat layer 1 |
| Functional layer 3 | — | — | — | — | — | — | — |
| Transparent substrate/ colored layer | Colored layer 1 | Colored layer 7 | Colored layer 1 | TAC | TAC | TAC | TAC |

TABLE 2-continued

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Transparent substrate/ colored layer | TAC | TAC | TAC | Colored layer 8 | Colored layer 9 | Colored layer 10 | — |

The compositions of the materials used to form the colored layer in the Examples and Comparative Examples is shown in Table 3.

TABLE 3

| | | Colored layer 1 | Colored layer 2 | Colored layer 3 | Colored layer 4 | Colored layer 5 |
|---|---|---|---|---|---|---|
| Colorant | First colorant | Dye-1 | | | | |
| | Amount added | 0.08% | | | | |
| | Second colorant | Dye-2/Dye-3 | | | | |
| | Ratio | 53/47 | | | | |
| | Amount added | 0.26% | | | | |
| | Third colorant | — | | | | |
| | Ratio | — | | | | |
| | Amount added | — | | | | |
| Black organic pigment | Amount added | 0.52% | | | | — |
| Additive | Type | — | Tinuvin249 | Chimassorb 944FDL | Chimassorb 944FDL/ D1781 | Chimassorb 944FDL/ D1781 |
| | Ratio | — | 100 | 100 | 67/33 | 67/33 |
| | Amount added | — | 1.40% | 1.40% | 2.18% | 2.18% |
| Ultraviolet absorber | Type | — | | | — | — |
| | Ratio | — | | | — | — |
| | Amount added | — | | | — | — |
| Active energy ray-curable resin | Type | UA-306H/DPHA/PETA | | | | |
| | Ratio | 70/20/10 | | | | |
| | Amount added | 44.59% | 43.19% | 43.19% | 42.42% | 42.94% |
| Photopoly-merization initiator | Type | Omnirad TPO | | | | |
| | Amount added | 4.54% | | | | |
| Solvent | Type | MEK/Methyl acetate | | | | |
| | Ratio | 50/50 | | | | |
| | Amount added | 50.00% | | | | |

| | | Colored layer 6 | Colored layer 7 | Colored layer 8 | Colored layer 9 | Colored layer 10 |
|---|---|---|---|---|---|---|
| Colorant | First colorant | Dye-1 | | | | |
| | Amount added | 0.18% | 0.08% | 0.13% | 0.19% | 0.24% |
| | Second colorant | Dye-2/Dye-3 | | | | |
| | Ratio | 81/19 | 53/47 | 99/1 | 99/1 | 78/22 |
| | Amount added | 0.29% | 0.26% | 0.60% | 0.86% | 0.33% |
| | Third colorant | Dye-4 | — | — | — | Dye-4/ Dye-5 |
| | Ratio | 100 | — | — | — | 87/13 |
| | Amount added | 0.30% | — | — | — | 2.54% |
| Black organic pigment | Amount added | 0.37% | 0.52% | 0.22% | — | — |
| Additive | Type | Chimassorb 944FDL/ D1781 | — | — | Chimassorb 944FDL/ D1781 | Chimassorb 944FDL/ D1781 |

TABLE 3-continued

| | | | | | | |
|---|---|---|---|---|---|---|
| | Ratio | 67/33 | — | — | 67/33 | 67/33 |
| | Amount added | 2.18% | — | — | 2.18% | 2.18% |
| Ultraviolet absorber | Type | — | Tinuvin479/LA36 | — | — | — |
| | Ratio | — | 40/60 | — | — | — |
| | Amount added | — | 3.20% | — | — | — |
| Active energy ray-curable resin | Type | UA-306H/DPHA/PETA | | | | |
| | Ratio | 70/20/10 | | | | |
| | Amount added | 42.16% | 41.39% | 44.51% | 42.33% | 40.18% |
| Photopolymerization initiator | Type | Omnirad TPO | | | | |
| | Amount added | 4.54% | | | | |
| Solvent | Type | MEK/Methyl acetate | | | | |
| | Ratio | 50/50 | | | | |
| | Amount added | 50.00% | | | | |

<Preparation of Optical Film>

The method of forming each layer will be described below.

[Formation of Colored Layer]

(Materials Used in Composition for Forming Colored Layer)

The materials contained in the colored layer are as follows. The maximum absorption wavelength and the half-width of the colorants were calculated from the characteristic values of the cured coating film based on the spectral transmittance.

First Colorant:

Dye-1 Pyrromethene cobalt complex dye represented by the chemical formula 1 below (maximum absorption wavelength 493 nm, half-width 26 nm)

[Chem. 1]

(Chemical Formula 1)

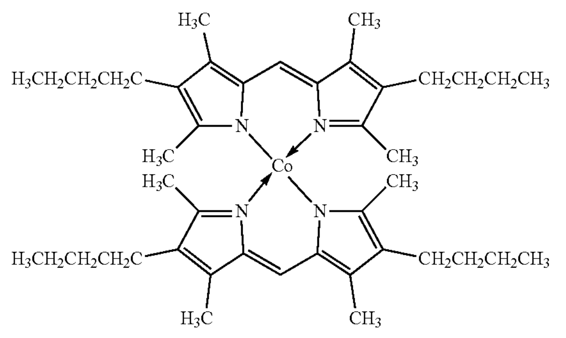

Second Colorant:

Dye-2 Tetraazaporphyrin copper complex dye (manufactured by Yamada Chemical Co., Ltd. FDG-007, maximum absorption wavelength 595 nm, half-width 22 nm)

Dye-3 Tetraazaporphyrin copper complex dye (manufactured by Yamamoto Kasei Co., Ltd. PD-311S, maximum absorption wavelength 586 nm, half-width 22 nm)

Third Colorant:

Dye-4 Phthalocyanine copper complex dye (manufactured by Yamada Chemical Co., Ltd. FDN-002, maximum absorption wavelength 800 nm, minimum transmittance wavelength between 400 to 780 nm 780 nm)

Dye-5 Phthalocyanine cobalt complex dye (manufactured by Yamada Chemical Co., Ltd. FDR-002, maximum absorption wavelength 683 nm, minimum transmittance wavelength between 400 to 780 nm 683 nm)

Black organic pigment: Black organic pigment dispersion (manufactured by Tokushiki Co., Ltd. IRBK-001)

Hindered amine-based light stabilizer Chimassorb (registered trademark) 944FDL (manufactured by BASF Japan, molecular weight 2,000 to 3,100)

Hindered amine-based light stabilizer Tinuvin (registered trademark) 249 (manufactured by BASF Japan, molecular weight 482)

Singlet oxygen quencher D1781 (manufactured by Tokyo Kasei Kogyo Co., Ltd.)

Ultraviolet Absorber:

Tinuvin (registered trademark) 479 (manufactured by BASF Japan, maximum absorption wavelength 322 nm)

LA-36 (manufactured by ADEKA Corporation, maximum absorption wavelength 310 nm, 350 nm)

Active Energy Ray-Curable Resin:

UA-306H (manufactured by Kyoeisha Chemical Co., Ltd., pentaerythritol triacrylate hexamethylene diisocyanate urethane prepolymer)

DPHA (dipentaerythritol hexaacrylate)

PETA (pentaerythritol triacrylate)

Initiator:

Omnirad (registered trademark) TPO (manufactured by IGM Resins B.V., absorption wavelength peaks 275 nm, 379 nm)

The transparent substrates listed in Table 3 are as follows.

TAC: Triacetylcellulose film (manufactured by Fuji Film Co., Ltd. TG60UL, substrate thickness 60 μm, ultraviolet blocking rate 92.9%)

PMMA: Polymethyl methacrylate film (manufactured by Sumitomo Chemical Co., Ltd. W001U80, substrate thickness 80 μm, ultraviolet blocking rate 93.4%)

PET1: Polyethylene terephthalate film (manufactured by Toyobo Co., Ltd. SRF, substrate thickness 80 μm, ultraviolet blocking rate 88.3%)

PET2: Polyethylene terephthalate film (manufactured by SKC TOR20, substrate thickness 40 μm, ultraviolet blocking rate 88.6%)

The composition for forming a colored layer shown in Table 3 was applied to one surface of the transparent substrate, and then dried in an oven at 80° C. for 60 seconds. Then, the coating film was cured by irradiation of ultraviolet light with an irradiation dose of 150 mJ/$cm^2$ using an ultraviolet light irradiation device (manufactured by Fusion UV Systems Japan Co., Ltd., H bulb light source), and the colored layers 1 to 10 were formed such that the film thickness after curing was 5.0 μm. Note that the addition amount is a mass ratio.

[Formation of Functional Layer]

Composition for Forming Oxygen Barrier Layer:

PVA117 (manufactured by Kuraray Co., Ltd.) 80% aqueous solution (Formation of Oxygen Barrier Layer)

The composition for forming an oxygen barrier layer was applied to the transparent substrate and then dried to form an oxygen barrier layer having an oxygen permeability of 1 cc/$m^2$·day·atm.

The composition used to form the hard coat layer of the Examples and Comparative Examples is shown in Table 4.

TABLE 4

| | | Hard coat layer 1 | Hard coat layer 2 | Hard coat layer 3 |
|---|---|---|---|---|
| UV absorber | Type | — | | Tinuvin479/LA36 |
| | Ratio | — | | 40/60 |
| | Amount added | — | | 3.20% |
| Black organic pigment | Amount added | — | 0.52% | |
| Active energy ray-curable resin | Type | UA-306H/DPHA/PETA | | |
| | Ratio | 70/20/10 | | |
| | Amount added | 45.46% | 44.94% | 42.26% |
| Photopolymerization initiator | Type | Omnirad TPO | | Omnirad 184 |
| | Amount added | 4.54% | | |
| Solvent | Type | MEK/Methyl acetate | | |
| | Ratio | 50/50 | | |
| | Amount added | 50.00% | | |

Of the materials listed in Table 4, those that have not been described above are noted below.

Photopolymerization Initiator:

Omnirad (registered trademark) 184 (manufactured by IGM Resins B. V., absorption wavelength peaks: 243 nm, 331 nm)

(Formation of Hard Coat Layer)

The corresponding composition for forming a hard coat layer was applied to the transparent substrate or a predetermined layer, dried in an oven at 80° C. for 60 seconds, and then the coating film was cured by irradiation of ultraviolet light with an irradiation dose of 150 mJ/$cm^2$ using an ultraviolet light irradiation device (manufactured by Fusion UV Systems Japan Co., Ltd., H bulb light source) to form the hard coat layers 1 to 3 having a film thickness of 5.0 μm after curing.

The composition of the composition for forming the antiglare layer is noted below.

Active Energy Ray-Curable Resin:

LIGHT ACRYLATE PE-3A (manufactured by Kyoeisha Chemical Co., Ltd., refractive index: 1.52) 43.7 parts by mass Photopolymerization Initiator:

Omnirad TPO 4.55 parts by mass

Resin Particles:

Styrene-methyl methacrylate copolymer particles (refractive index: 1.515, average particle size: 2.0 μm) 0.5 parts by mass Inorganic Fine Particles 1:

Synthetic smectite 0.25 parts by mass

Inorganic Fine Particles 2:

Alumina nanoparticles, average particle size: 40 nm 1.0 parts by mass

Solvent

Toluene 5 parts by mass

Isopropyl alcohol 35 parts by mass

[Formation of Antiglare Layer]

The composition for forming the antiglare layer described above was applied to the transparent substrate, dried in an oven at 80° C. for 60 seconds, and then the coating film was cured by irradiation of ultraviolet light with an irradiation dose of 150 mJ/$cm^2$ using an ultraviolet light irradiation device (manufactured by Fusion UV Systems Japan Co., Ltd., H bulb light source) to form the antiglare layer having a film thickness of 5.0 μm after curing.

The composition of the composition for forming the low refractive index layer is noted below.

Refractive Index Modifier:

Porous silica fine particle dispersion (average particle size: 75 nm, solid content: 20%, solvent: methyl isobutyl ketone) 8.5 parts by mass Antifouling Agent:

Optool AR-110 (manufactured by Daikin Industries Ltd., solids content: 15%, solvent: methyl isobutyl ketone) 5.6 parts by mass Active Energy Ray-Curable Resin:

Pentaerythritol triacrylate 0.4 parts by mass

Initiator:

Omnirad 184 0.07 parts by mass

Leveling Agent:

RS-77 (manufactured by DIC Corporation) 1.7 parts by mass

Solvent:

Methyl isobutyl ketone 83.73 parts by mass (Formation of Low Refractive Index Layer)

The composition for forming the low refractive index layer described above was applied to a predetermined layer, dried in an oven at 80° C. for 60 seconds, and then the coating film was cured by irradiation of ultraviolet light with an irradiation dose of 200 mJ/$cm^2$ using an ultraviolet light irradiation device (manufactured by Fusion UV Systems Japan Co., Ltd., H bulb light source) to form the low refractive index layer having a film thickness of 100 nm after curing.

The following evaluations were performed with respect to the optical films of the Examples and Comparative Examples.

[Optical Film Characteristics]

(Lightfastness Test)

A xenon weather meter tester (manufactured by Suga Test Instruments Co., Ltd., X75) was used to test the optical film of each Example for 120 hours using a xenon lamp illuminance of 60 W/$cm^2$ (300 to 400 nm), a test instrument internal temperature of 45° C., and a humidity of 50% RH as test conditions.

A transmittance measurement was performed before and after the test using an automatic spectrophotometer (manufactured by Hitachi Ltd., U-4100), and a pre- and post-test transmittance difference $\Delta T\lambda 1$ at a wavelength $\lambda 1$ that represents the minimum transmittance before testing in a wavelength range of 470 nm to 530 nm, and a pre- and post-test transmittance difference $\Delta T\lambda 2$ at a wavelength $\lambda 2$ that represents the minimum transmittance before testing in a wavelength range of 560 nm to 620 nm were calculated. The closer to zero the transmittance difference is, the better, and preferably $|\Delta T\lambda N| \leq 20$ (N=1 to 2), and more preferably $|\Delta T\lambda N| \leq 10$ (N=1 to 2).

(Pencil Hardness Test)

The surface on the first surface side (the side on which the functional layers are provided) of the optical film of each Example was subjected to testing using a Clemens-type scratch hardness tester (manufactured by Tester Sangyo Co., Ltd, HA-301) in accordance with JIS-K5600-5-4:1999, using a pencil (manufactured by Mitsubishi Pencil Co., Ltd., UNI, pencil hardness: H) under a load of 500 gf (4.9 N) (hereinafter referred to as a 500 g load). Changes in appearance due to scratches were visually evaluated, and cases in which no scratches were observed were graded as good (listed as "good" in the table below), and cases in which scratches were observed were graded as poor (listed as "poor" in the table below).

(Ultraviolet Blocking Rate on Upper Side of Colored Layer)

In Examples 1 to 13 and Comparative Examples 4 to 7, which had the transparent substrate positioned above the colored layer, the transmittance of the transparent substrate was measured using an automatic spectrophotometer (manufactured by Hitachi, Ltd., U-4100). For Comparative Examples 1 to 3, which had the colored layer positioned above the transparent substrate, the layers above the colored layer were peeled off using cellophane tape compliant with the JIS-K5600 adhesion test, and the transmittance above the colored layer was measured using an automatic spectrophotometer (manufactured by Hitachi, Ltd., U-4100) with the cellophane tape as a reference. These transmittance values were used to calculate the average transmittance [%] in the ultraviolet region (290 nm to 400 nm), and the ultraviolet blocking rate [%] was calculated as the value obtained by subtracting the average transmittance [%] in the ultraviolet region (290 nm to 400 nm) from 100%.

[Display Device Characteristics]

The display device characteristics were evaluated with respect to Example 5, Example 12, and Comparative Examples 4 to 7. Since Example 5 had the same colorant configuration as Examples 1 to 4, 6 to 11, and 13, it can be assumed that the display device characteristics of these Examples were equivalent to those of Example 5.

(White Display Transmission Characteristic)

Figure 7:
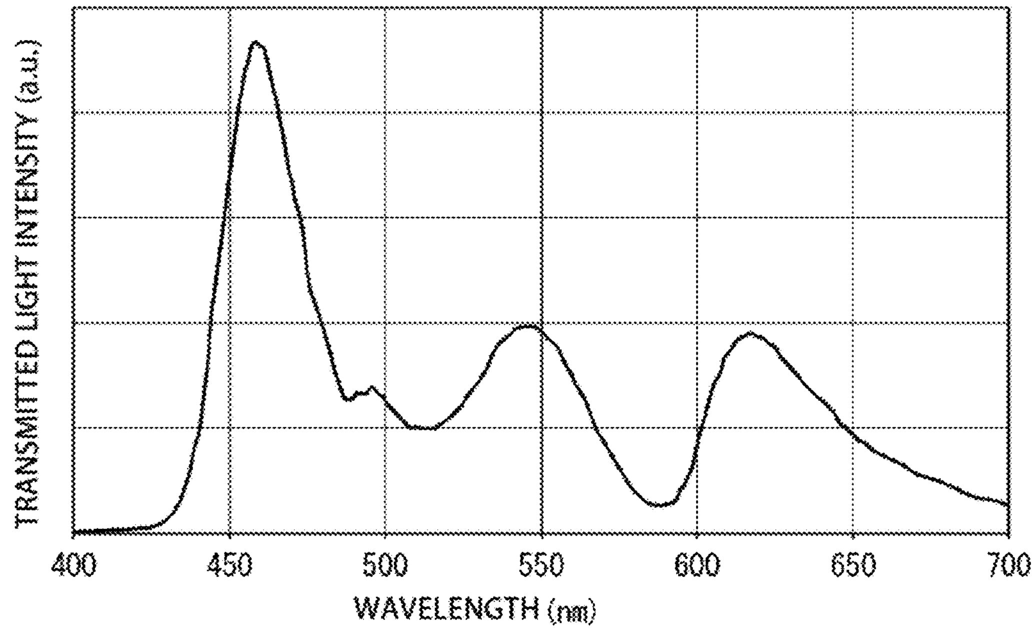
FIG. 7 is a graph showing a spectrum obtained while displaying a white color that has been output through an organic EL light source and a color filter according to an Example.

The transmittance of the optical film of each Example was measured using an automatic spectrophotometer (U-4100), and the transmittance was used to calculate the efficiency of light transmitted through the optical film during white display, which was evaluated as the white display transmission characteristic. The efficiency mentioned above was calculated as a ratio of the light intensity value at each wavelength of light transmitted through the optical film, with 100 being the light intensity at each wavelength during a white display that has been emitted from a white organic EL light source and output after being passed through a color filter. The luminance efficiency of the light source increases as the light intensity ratio increases. FIG. 7 shows the spectrum of light emitted by an EL light source.

(Display Device Reflection Characteristic 1)

The transmittance T(λ) and the surface reflectance R2(λ) of the optical film of each Example were measured using an automatic spectrophotometer (U-4100). Measurement of the surface reflectance R2(λ) was performed by applying a matte black paint to the surface on the second surface side (the side on which the functional layers were not formed) as a reflection prevention treatment, and the surface reflectance R2(λ) was obtained by performing a spectral reflectance measurement with an incidence angle of 5°. The electrode reflectance RE(λ) was set to 100% for all wavelengths from 380 nm to 780 nm, and the relative reflection value, where 100 represents the light intensity of the reflected light that is reflected when using a D65 light source when an optical film is not provided, was calculated based on equations (4), (5), (7), and (9) without considering interfacial reflections at each layer and surface reflection, and was evaluated as the display device reflection characteristic 1. The intensity of the reflected light decreases as the relative reflection value decreases, which increases the display quality.

(Display Device Reflection Hue 1)

Using the transmittance T(λ) and the surface reflectance R2(λ) of the optical film of each Example acquired in the evaluation of the display device reflection characteristic 1, the electrode reflectance RE(λ) was set to 100% for all wavelengths from 380 nm to 780 nm, and the reflection hue values a* and b* when using a D65 light source were calculated based on equations (1) to (9) above without considering interfacial reflections at each layer and surface reflection, and were evaluated as the display device reflection hue 1.

a* and b* values closer to zero are better due to the absence of coloration, and the values are preferably −5 or more and +5 or less.

(Display Device Reflection Characteristic 2)

Figure 9:
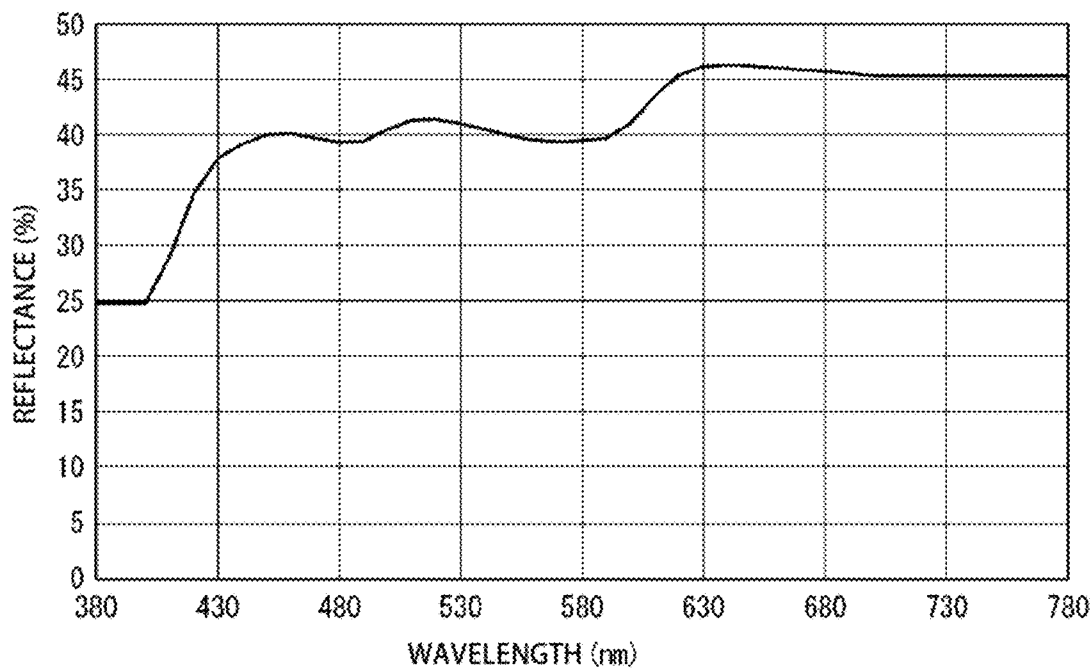
FIG. 9 shows the electrode reflectance of an organic EL display device for which a display device reflection characteristic 2 and a display device reflection hue 2 are calculated in an Example.

Except for using the electrode reflectance obtained from a reflectance measurement of an organic light-emitting display device (organic EL television manufactured by LG Electronics, OLED 55C8PJA) as the electrode reflectance RE(λ), calculation was performed in the same manner as the display device reflection characteristic 1, and the obtained result was evaluated as the display device reflection characteristic 2. Like the display device reflection characteristic 1, the intensity of the reflected light decreases as the relative reflection value decreases, which increases the display quality. FIG. 9 shows the electrode reflection profile of the organic light-emitting display device.

(Display Device Reflection Hue 2)

Except for using the electrode reflectance obtained from a reflectance measurement of an organic light-emitting display device (organic EL television manufactured by LG Electronics, OLED 55C8PJA) as the electrode reflectance RE(λ), calculation was performed in the same manner as for the display device reflection hue 1, and the obtained result was evaluated as the display device reflection hue 2. Like the display device reflection hue 1, a* and b* values closer to zero are better due to the absence of coloration, and the values are preferably −5 or more and +5 or less.

(Color Reproducibility)

Figure 8:
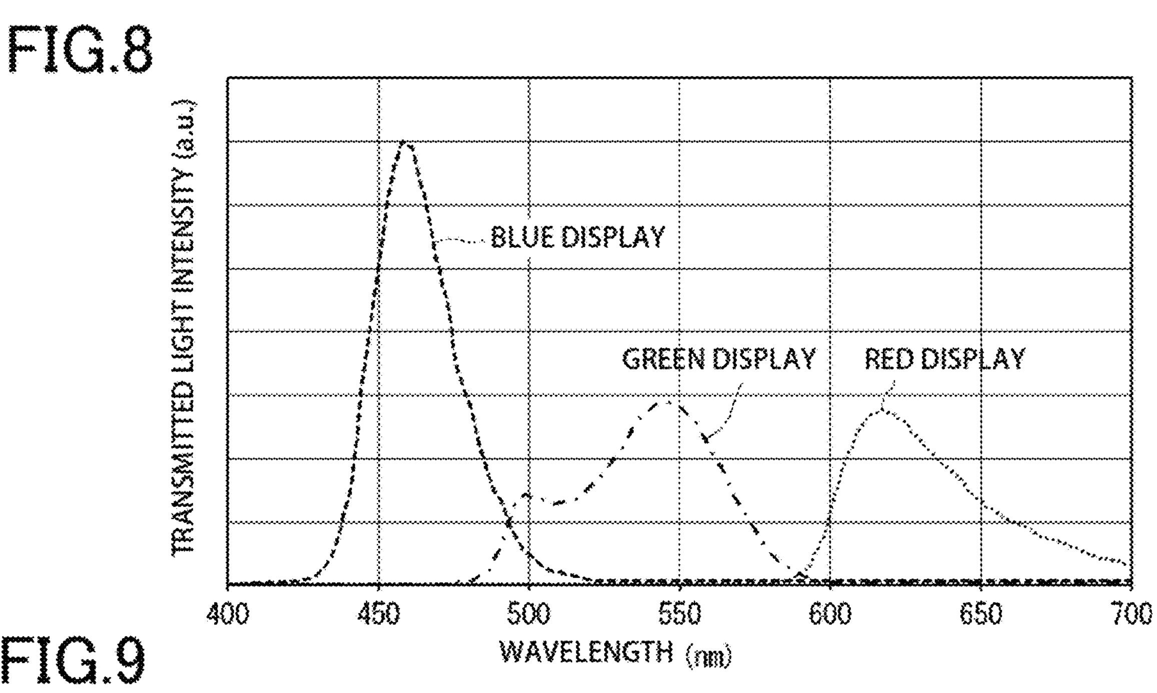
FIG. 8 is a graph showing the respective spectra obtained while displaying red, while displaying green, and while displaying blue that have been output through an organic EL light source and a color filter in an Example.

An automatic spectrophotometer (U-4100) was used to measure the transmittance of the optical film of each Example, the NTSC ratio was calculated using the transmittance and the CIE 1931 chromaticity value calculated using display spectra such as those shown in FIG. 8 for red display, green display, and blue display output after an organic EL light source having the spectrum shown in FIG. 7 was passed through a color filter, and the NTSC ratio was evaluated as the color reproducibility. A higher NTSC ratio is preferable because the color reproducibility becomes wider.

The optical film characteristics of the Examples are shown in Table 5, and the optical film characteristics of the Comparative Examples are shown in Table 6. Here, AEab is represented as a distance between two points in an L*, a*, b* color space (CIE 1976) before and after testing under a C light source, with values closer to zero being better, and the value preferably being ΔEab≤3.

TABLE 5

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Ultraviolet blocking rate on upper side of colored layer | | 92.9% | 92.9% | 92.9% | 92.9% | 92.9% | 93.4% | 88.3% | 88.6% | 92.9% | 92.9% | 95.5% | 92.9% | 92.9% |
| Pencil hardness | | Good | Good | Good | Good | Good | Good | Good | Good | Good | Good | Good | Good | Good |
| Lightfastness | ΔTλ1 | 9.0 | 8.8 | 7.9 | 6.0 | 4.3 | 4.1 | 5.3 | 5.2 | 4.4 | 4.3 | 4.3 | 7.1 | 3.8 |
| | ΔTλ2 | 1.7 | 1.6 | 1.6 | 1.4 | 1.3 | 1.2 | 1.6 | 1.6 | 1.3 | 1.3 | 1.3 | 0.8 | 1.0 |
| | ΔEab | 2.5 | 2.5 | 2.4 | 2.2 | 2.1 | 2.0 | 2.3 | 2.3 | 2.1 | 2.1 | 2.1 | 3.5 | 1.8 |

TABLE 6

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Ultraviolet blocking rate on upper side of colored layer | | 7.2% | 7.2% | 90.5% | 92.9% | 92.9% | 92.9% | 92.9% |
| Pencil hardness | | Good | Good | Poor | Good | Good | Good | Good |
| Lightfastness | ΔTλ1 | 18.5 | 12.1 | 9.3 | 5.4 | 6.6 | 12.8 | 0.1 |
| | ΔTλ2 | 24.5 | 12.3 | 2.1 | 1.5 | 3.4 | 0.9 | 0.2 |
| | ΔEab | 7.7 | 4.5 | 2.8 | 2.5 | 1.4 | 5.1 | 0.4 |

Table 7 shows the evaluation results of the display device characteristics. Table 7 also shows relative values, where 100 represents Comparative Example 7 which did not have a colored layer.

TABLE 7

| | | Ex. 5 | Ex. 12 | Comp. Ex. 4 | Comp. Ex. 5 | Comp. Ex. 6 | Comp. Ex. 7 |
|---|---|---|---|---|---|---|---|
| White display transmission | | 51.7 | 51.8 | 52.4 | 52.2 | 51.9 | 91.4 |
| characteristic | vs. Comp. Ex. 7 | 55.6% | 56.7% | 57.4% | 57.1% | 56.7% | — |
| Display device reflection | | 25.8 | 25.8 | 25.8 | 25.8 | 25.8 | 83.7 |
| characteristic 1 | vs. Comp. Ex. 7 | 30.8% | 30.8% | 30.8% | 30.8% | 30.8% | — |
| Display device reflection | a* | 2.0 | 1.0 | 15.2 | 26.0 | 4.0 | −0.2 |
| hue 1 | b* | −2.0 | −1.0 | −15.8 | −24.2 | −4.0 | 0.9 |
| Display device reflection | | 11.2 | 11.2 | 11.3 | 11.4 | 11.2 | 34.8 |
| characteristic 2 | vs. Comp. Ex. 7 | 32.3% | 32.2% | 32.5% | 32.6% | 32.2% | — |
| Display device reflection | a* | 3.1 | 2.1 | 12.5 | 20.1 | 4.0 | 1.4 |
| hue 2 | b* | 0.1 | 0.9 | −9.4 | −15.1 | −1.2 | 2.7 |
| Color reproducibility | NTSC ratio | 95.5% | 95.8% | 98.3% | 100.3% | 95.9% | 91.7% |

From the results of the lightfastness test of Example 2 and Comparative Example 3, it can be seen that by positioning the transparent substrate having an ultraviolet blocking rate of 85% or more above the colored layer, the hardness of the optical film is maintained, and fading of the colored layer can be significantly reduced. In Comparative Example 2, although the colored layer contains an ultraviolet absorber, the fading suppression effect was low compared to the Examples.

From the results of the lightfastness of Examples 2 and 3, it can be seen that the lightfastness is improved when the colored layer contains a HALS.

From the results of the lightfastness test of Examples 3 and 4, it can be seen that high molecular weight HALS is more effective in improving the lightfastness than a low molecular weight HALS.

From the results of the lightfastness test of Examples 4 and 5, it can be seen that the lightfastness is further improved by using a singlet oxygen quencher in combination with a high molecular weight HALS.

From the results of the lightfastness of Examples 2 and 13, it can be seen that the lightfastness is further improved by providing an oxygen barrier layer.

From the results of the lightfastness of Examples 6 to 8, it can be seen that the lightfastness of the colored layer similarly improves when a transparent substrate other than TAC is used that has an ultraviolet blocking rate of 85% or more.

From the results of Examples 9 and 10, it can be seen that the same hardness and lightfastness can be achieved even with a configuration in which an antiglare layer is provided as a functional layer.

From the results of Example 12, it can be seen that the lightfastness is similarly improved even when the colored layer contains a third colorant.

From the results of Example 11, it can be seen that the lightfastness of the colored layer is similarly improved even when a black organic pigment is not contained in the colored layer but is contained in the functional layer.

In Comparative Example 4, although the first colorant, the second colorant, and the black organic pigment were contained in the colored layer, the reflection hue was significantly shifted and the display quality characteristics were inferior. Therefore, it can be seen that in order to set a* and b* in the preferable range mentioned above, it is important to include the colorants and the black organic pigment in an appropriate ratio.

In the optical film according to the present invention, it is possible to suppress the amount of colored material included in the colored layer by including the black organic pigment. As a result, it is possible to provide an optical film that achieves each of low reflection, luminance efficiency, and reliability.

In the display device according to Examples 5 and 11, the reflection characteristics were significantly reduced compared to the display device according to Comparative Example 7, which did not have a colored layer. Generally, it is said that the transmittance is halved when a circularly polarizing plate is used, but in the display device according to Examples 5 and 11, the luminous efficiency was excellent as shown by the evaluation value of the white display transmission characteristic, and the color reproducibility was also improved.

In the display device according to Comparative Example 5 not containing a black organic pigment, the reflection hue was significantly shifted and the display quality characteristics were inferior.

Although the display device according to Comparative Example 6 contained the first colorant, the second colorant, and the third colorant in the colored layer, because it did not contain the black organic pigment, the lightfastness was low and the reliability was inferior.

In the optical film according to each example, by configuring the colored layer such that a* and b* of the display device reflection hue 1 were each in a range of −5 to +5, the reflection hue could also be maintained neutral in terms of the display device reflection hue 2, which assumes the electrode reflectance of an actual organic light-emitting display device.

Industrial Applicability

According to the present invention, it is possible to provide an optical film, a display device, and a composition for forming a colored layer that can improve the display quality due to external light reflection, and improve the life of the light-emitting element of a display device.

[Reference Signs List] 10A, 10B, 10C, 10D, 10E Optical film; 11 Transparent substrate; 11*a* First surface; 11*b* Second surface; 12 Colored layer; 14A, 14B, 14E Low refractive index layer; 16 Oxygen barrier layer; 17 Antiglare layer; 20 Display unit; 21 Substrate; 22 Light-emitting element; 22R First light-emitting element; 22G Second light-emitting element; 22B Third light-emitting element; 23 Color filter unit; 50A, 50B, 50C, 50D, 50E Display device.

What is claimed is:

1. An optical film, comprising:

a transparent substrate having an ultra violet blocking rate of 85% or more, wherein the ultraviolet blocking rate ultraviolet blocking rate is calculated by subtracting an average transmittance in a wavelength range from 290 nm to 400 nm of the transparent substrate expressed in percent (%) from 100%;

one or more functional layers formed on a first surface side of the transparent substrate; and a colored layer that is formed on a second surface side of the transparent substrate that is configured by one or more layers containing a colored material;

wherein the colored layer contains a first colorant that has a maximum absorption wavelength in a range of 470 nm or more and 530 nm or less, an absorption spectrum thereof having a halfwidth of 15 nm or more and 45 nm or less, and a second colorant that has a maximum absorption wavelength in a range of 560 nm or more and 620 nm or less, an absorption spectrum thereof having a half-width of 15 nm or more and 55 nm or less, at least one of the functional layer and the colored layer contains a black organic pigment, and hue values a* and b* defined by equations (1) to (9) below are each in a range of −5 or more and +5 or less

[Math. 1]

$$a^* = 500\left\{f\left(\frac{X}{X_n}\right) - f\left(\frac{Y}{Y_n}\right)\right\} \quad (1)$$

[Math. 2]

$$b^* = 200\left\{f\left(\frac{Y}{Y_n}\right) - f\left(\frac{Z}{Z_n}\right)\right\} \quad (2)$$

[Math. 3]

$$f(t) = \begin{cases} t^{\frac{1}{3}}, & \left[t > \left(\frac{6}{29}\right)^3\right] \\ \frac{1}{3}\left(\frac{29}{6}\right)^2 t + \frac{4}{29}, & \left[t \le \left(\frac{6}{29}\right)^3\right] \end{cases} \quad (3)$$

[Math. 4]

$$R1(\lambda)[\%] = \frac{(100 - R2(\lambda))}{100} \times \frac{T(\lambda)}{100} \times \frac{T(\lambda)}{100} \times R_E(\lambda) \quad (4)$$

[Math. 5]

$$R(\lambda)[\%] = R1(\lambda) + R2(\lambda) \quad (5)$$

[Math. 6]

$$X = k \times \int_{380}^{780} P_{D65}(\lambda) \times R(\lambda) \times \bar{x}(\lambda)\, d\lambda \quad (6)$$

[Math. 7]

$$Y = k \times \int_{380}^{780} P_{D65}(\lambda) \times R(\lambda) \times \bar{y}(\lambda)\, d\lambda \quad (7)$$

[Math. 8]

$$Z = k \times \int_{380}^{780} P_{D65}(\lambda) \times R(\lambda) \times \bar{z}(\lambda)\, d\lambda \quad (8)$$

[Math. 9]

$$k = 100 / \int_{380}^{780} P_{D65}(\lambda) \times R(\lambda) \times \bar{y}(\lambda)\, d\lambda \quad (9)$$

wherein λ is a variable representing a wavelength, and t is a variable representing a ratio of X, Y, and Z with respect to Xn, Yn, and Zn, a* and b* calculated from equations (1) to (3) are calculated according to a calculation method in a CIE 1976 L*, a*, b* color space (CIELAB color space), In equations (1) and (2), Xn, Yn, and Zn are tristimulus values at a white point of a D65 light source, in equation (4), RE(λ) is a function representing a reflectance [%] at a completely diffuse reflection surface (100% at every wavelength), R2(λ) is a function representing a surface reflectance [%] at an outermost surface of the optical film on an opposite side to the colored layer, and T(λ) is a function representing a transmittance of the optical film, in equations (6) to (9), PD65(λ) is a D65 light source spectrum, x-bar(λ), y-bar(λ), and z-bar(λ) are CIE1931 color matching functions at 2° field of view, a definite integral in equations (6) to (9) can be calculated by an appropriate numerical integration, a wavelength interval when performing a numerical integration is, a 1 nm interval.

2. The optical film of claim 1, wherein
a pencil hardness of a surface on the functional layer side under a 500 g load is H or higher.

3. The optical film of claim 1, wherein
the colored layer contains at least one of a radical scavenger, a peroxide decomposer, and a singlet oxygen quencher.

4. The optical film of claim 3, wherein
the colored layer contains, as the radical scavenger, a hindered amine-based light stabilizer having a molecular weight of 2,000 or more.

5. The optical film of claim 3, wherein
the colored layer contains, as the singlet oxygen quencher, one of a dialkyl phosphate, dialkyl dithiocarbanate, benzenedithiol, or a transition metal complex thereof.

6. The optical film of claim 1, wherein
the colored layer further contains a third colorant that has, in a wavelength range of 400 to 780 nm, a wavelength of lowest transmittance in a range of 650 nm to 780 nm.

7. The optical film of claim 1, wherein
the colored material contains at least one or more compounds selected from a group consisting of compounds having one of a porphyrin structure, a merocyanine structure, a phthalocyanine structure, an azo structure, a cyanine structure, a squarylium structure, a coumarin structure, a polyene structure, a quinone structure, a tetradiporphyrin structure, a pyrromethene structure, and an indigo structure, and metal complexes thereof.

8. The optical film of claim 1, wherein
the functional layer contains an oxygen barrier layer having an oxygen permeability of 10 $cc/m^2 \cdot day \cdot atm$ or less.

9. The optical film of claim 1, wherein
the functional layer has a first layer and a second layer,
the first layer and the second layer are laminated in this order in a direction from the colored layer toward the transparent substrate, and a refractive index of the second layer is lower than a refractive index of the first layer.

10. The optical film of claim 1, wherein
the functional layer further comprises an antiglare layer.

11. The optical film of claim 1, wherein
the functional layer contains at least one of an antistatic layer containing an antistatic agent, and an antifouling layer having water repellency.

12. A display device, comprising:
a light source; and
an optical film of claim 1.

13. The display device of claim 12, wherein
the light source includes a plurality of light-emitting elements that emit light based on an image signal.

14. A composition for forming a colored layer comprising an active energy ray-curable resin, a photopolymerization initiator, a black organic pigment, a colored material, an additive, and a solvent, wherein
the colored material contains
a first colorant that has a maximum absorption wavelength in a range of 470 nm or more and 530 nm or less, an absorption spectrum thereof having a half-width of 15 nm or more and 45 nm or less, and
a second colorant that has a maximum absorption wavelength in a range of 560 nm or more and 620 nm or less, an absorption spectrum thereof having a half-width of 15 nm or more and 55 nm or less, and
the additive contains a radical scavenger.

* * * * *